(12) United States Patent
Zahir et al.

(10) Patent No.: US 11,434,339 B2
(45) Date of Patent: *Sep. 6, 2022

(54) METHOD FOR MAKING A PEG PHASE CHANGE COMPOSITE

(71) Applicant: King Fahd University of Petroleum and Minerals, Dhahran (SA)

(72) Inventors: Md. Hasan Zahir, Dhahran (SA); Mohammad Mizanur Rahman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 282 days.

This patent is subject to a terminal disclaimer.

(21) Appl. No.: 16/794,713

(22) Filed: Feb. 19, 2020

(65) Prior Publication Data

US 2020/0181346 A1 Jun. 11, 2020

Related U.S. Application Data

(63) Continuation of application No. 16/047,593, filed on Jul. 27, 2018, now Pat. No. 10,626,238.

(51) Int. Cl.
| | |
|---|---|
| *C08J 7/14* | (2006.01) |
| *C08K 3/26* | (2006.01) |
| *C08L 71/02* | (2006.01) |

(52) U.S. Cl.
CPC .................. *C08J 7/14* (2013.01); *C08K 3/26* (2013.01); *C08L 71/02* (2013.01); *C08J 2300/22* (2013.01);
(Continued)

(58) Field of Classification Search
None
See application file for complete search history.

(56) References Cited

U.S. PATENT DOCUMENTS

| | | | | |
|---|---|---|---|---|
| 9,493,695 B2* | 11/2016 | Ram | .................. | C08G 73/1035 |
| 10,626,238 B2* | 4/2020 | Zahir | ...................... | C08L 71/02 |

FOREIGN PATENT DOCUMENTS

| | | | |
|---|---|---|---|
| CN | 107365121 A | * | 11/2017 |
| WO | 2013/077379 A1 | | 5/2013 |

(Continued)

OTHER PUBLICATIONS

WO-2017206583-A1, Dec. 2017, Machine translation (Year: 2017).*

(Continued)

*Primary Examiner* — Satya B Sastri
(74) *Attorney, Agent, or Firm* — Oblon, McClelland, Maier & Neustadt, L.L.P.

(57) ABSTRACT

A heat energy storage system may have a shape-stabilized composite prepared using an easy impregnation method involving a porous $Ca^{2+}$-doped $MgCO_3$ matrix and PEG as the functional phase. The heat storage capability, microstructures, and interactions with the PEG/$CaMgCO_3$ composite can be characterized by DSC, SEM imaging, FT-IR spectroscopy, and TGA. Likely because of the synergistic phase change effect of $CaMgCO_3$ and PEG, the PEG/$CaMgCO_3$ composites can have high thermal enthalpies, and their enthalpy efficiencies are substantially higher than those of traditional shape stabilized PCMs. The functional material PEG can permeate porous $CaMgCO_3$ matrices under capillary action. Liquid PEG can be stabilized within the porous matrix, and/or the $CaMgCO_3$ matrix can improve the thermal stability of the PEG. The high heat energy storage properties and good thermal stability of such organic-inorganic composites offers utility in a range of applications, including thermal energy storage.

4 Claims, 26 Drawing Sheets

(52) U.S. Cl.
CPC ........ *C08J 2371/02* (2013.01); *C08J 2371/08* (2013.01); *C08K 2003/267* (2013.01); *C08L 2201/56* (2013.01)

(56) References Cited

FOREIGN PATENT DOCUMENTS

| WO | 106701034 A | 5/2017 | |
|---|---|---|---|
| WO | 2017/206583 A1 | 7/2017 | |
| WO | 107365121 A | 11/2017 | |
| WO | WO-2017206583 A1 * | 12/2017 | ............... C09K 5/06 |
| WO | 107954671 A | 4/2018 | |

OTHER PUBLICATIONS

CN-107365121-A, 11-017, Machine translation (Year: 2017).*

Karaman et al., , Polyethylene glycol (PEG)/diatomite composite as a novel form-stable phase change material for thermal energy storage, Solar Energy Materials and Solar Cells, vol. 95, issue 7, Jul. 2011, English Abstract (Year: 2011).*

Gutierrez et al., Use of polyethylene glycol for the improvement of the cycling stability of bischofite as thermal energy storage material, Applied Energy, vol. 154, Sep. 15, 2015, English Abstract (Year: 2015).*

Hao et al., Porous MgO material with ultrahigh surface area as the matrix for phase change composite, Thermochimica Acta, vol. 804, Mar. 2015, English Abstract (Year: 2015).*

Wen et al., Thermal energy storage properties and thermal reliability of PEG/bone char composite as a form-stable phase change material, J. of Thermal Analysis and Calorimetry, Jun. 2018, vol. 132, Issue 3, English Abstract (Year: 2018).*

* cited by examiner

METHOD FOR MAKING A PEG PHASE CHANGE COMPOSITE

CROSS-REFERENCE TO RELATED APPLICATIONS

The present application is a Continuation of Ser. No. 16/047,593, now U.S. Pat. No. 10,626,238, having a filing date of Jul. 27, 2018.

BACKGROUND OF THE INVENTION

Field of the Invention

The present disclosure relates to phase change materials (PCM) employing inorganic-organic composites, particularly PCMs useful in heat storage devices.

Description of the Related Art

A variety of materials, organic, inorganic, or mixtures thereof, can store ambient heat and release it when necessary by changing phase during temperature shifts. Such storage presents an opportunity for solar energy management and utilization. Phase change materials (PCMs) are important, and often commercially available, heat storage materials with a high density of latent heat and the capacity to maintain a constant temperature during heat release. PCMs can be used, for example, in smart housing, solar energy installations, temperature-controlled greenhouses, temperature-regulating textiles, electronics heat management, and the like. PCMs typically undergo a phase change near room temperature and/or have a high latent for utility in the aforementioned applications.

Polyethylene glycol (PEG) is useful for heat storage applications. PEG is low cost and offers good chemical stability, no phase segregation, an insignificant degree of supercooling, no toxicity, and good thermal and chemical stability properties. PEG is reusable, biocompatible, and undergoes a small volume change during phase transitions compared with solid-solid PCMs. Moreover, PEG has a melting temperature range that can be tuned in a range of from 32° C. to 60.7° C., depending on the PEG molecular weight. PEG is resistant to erosion, has a low vapor pressure, can be directly incorporated into carrier matrices, and is thermally stable.

However, PEG exhibits two unavoidable drawbacks. First, liquid PEG can leak during phase transition. Leaked liquid PEG can contaminate surrounding materials and jeopardize the function of a system. Second, PEG has a low thermal conductivity, which precludes its use in certain applications.

Inorganic PCMs have higher phase change enthalpies compared to organic compounds. Lithium and sodium carbonate composite PCM have been reported to have high thermal conductivities and an energy storage density over 530 kJ/kg. Lithium nitrate showed an energy storage density 357 J/g and sodium nitrate, 222 J/g. These hydrate salts are known to have high-energy storage density, but their supercooling properties are a significant drawback for practical application.

CN 107954671 A by Hu discloses a raw material for preparing a phase change thermostated diatomaceous plate, a phase change temperature-regulating diatomaceous plate, and a preparation method thereof. Hu's raw material comprises a separately packaged first slurry, a second slurry, and a binder. Hu's first slurry comprises a diatomaceous earth (amorphous silica, opal, $SiO_2.nH_2O$, also referred to as diatomite or kieselguhr) phase change composite material, a calcium material, a filler, and water. Hu's second slurry contains diatomaceous earth, a calcium material, active magnesium oxide, a filler, and water. In the first slurry and the second slurry, the liquid to solid ratio is independently (3 to 4): 1. Hu's organic phase change material is immersed in the pores of the modified diatomaceous earth to load the organic phase change material (PCM), ensuring the stable combination of the phase change material and the diatomaceous earth, and avoid leakage of the PCM. The first and second slurries simultaneously contain diatomaceous earth, and the two have good adaptability, and the layer structure is bonded by an adhesive to form a phase change temperature-controlled diatom plate, without using a special packaging container. Packaging of Hu's phase change temperature regulating material can avoid leakage of the PCM.

However, Hu appears to require a silicon oxide compound in at least 70 wt %, as well as a modified diatomite with an amino group bonded to its surface. Hu also requires a binder, which Hu teaches may be polyvinyl alcohol, polyethylene glycol, and polyethylene oxide. Hu does not indicate that the binder penetrates pores of its plates. Instead, Hu's organic phase change material is a composite of n-butyl stearate and methyl stearate or a paraffin wax, which may penetrate pores of the diatomaceous earth. Moreover, Hu does not describe a phase change composite of PEG encapsulated in a porous matrix of calcium ion doped magnesium carbonate.

CN 106701034 A by Wu discloses a solid composite phase-change thermal storage material comprising water, sodium carbonate, potassium carbonate, magnesium oxide, kieselguhr, quartz sand, and kaolin. Kaolin is a clay mineral with the chemical composition $Al_2Si_2O_5(OH)_4$, which is a layered silicate mineral, with one tetrahedral sheet of silica ($SiO_4$) linked through oxygen atoms to one octahedral sheet of alumina ($AlO_6$) octahedra. Wu discloses preparing the solid composite phase-change thermal storage material involving: stirring, rubbing sand, filtering, performing hydraulic molding, and performing sintering molding. Wu further discloses that the thermal storage density is improved to twice that of a common material, the thermal storage material can endure high temperature, can be heated to be greater than 650° C., and is not liable to efflorescence when being used for a long time.

However, Wu's inorganic component requires aluminum and/or silicon oxides, rather than, e.g., alkaline earth metal ions. Wu also requires at least 25 wt %, and preferably 34 to 45 wt %, MgO as a portion of its inorganic composition. Although Wu describes using conventional organic heat storage materials include higher aliphatic hydrocarbons, aromatic hydrocarbons, alcohols, carboxylic (fatty) acids, paraffin, etc., optionally including polyethylene glycol (PEG), Wu does not describe a phase change composite of PEG encapsulated in a porous matrix of an alkaline earth metal carbonate, particularly magnesium carbonate, and more particularly a calcium ion doped magnesium carbonate.

WO 2017/206563 A1 by Chen discloses a phase change energy storage powder and its preparation, relating to the field of building energy-saving materials. Chen discloses a powder type energy storage material comprising an anti-supercooling agent prepared by extrusion cladding using a screw. Chen's phase change energy storage powder is prepared from the following components in parts by weight: 80 to 85 parts of a phase change material, 2 to 3 parts of an active agent, 0.1 to 0.3 parts of an anti-supercooling agent, 8 to 12 parts of a coating agent, 1 to 2 parts of a heat conduction agent, 0.5 to 1 parts of a stabilizer, and 2 to 3 parts of a flame-retardant agent. Chen's phase change energy storage powder is reported to have high energy density, not be supercooled, and be flame-retardant and highly compatible with most of building materials. According to Chen, the powder can be added in large quantity without affecting the strength of a building material, and can be applied to concrete, mortar, putty, paint, or the like.

However, Chen's phase change material is calcium chloride hexahydrate, sodium sulfate decahydrate, disodium hydrogen phosphate dodecahydrate, and/or sodium acetate trihydrate. Although Chen may describe using not more than 5%, of an active agent of glycerol fatty acid ester(s) and/or polyoxyethylene fatty acid glyceride(s), an encapsulated agent of ethylene-vinyl acetate copolymer, polycaprolactone, polyethylene wax, polypropylene wax, and/or rosin, Chen does not describe a phase change composite of inorganic encapsulated PEG PCMs, nor carbonate PCMs, much less composites thereof, particularly a PEG encapsulated porous matrix of calcium ion doped magnesium carbonate.

CN 107365121 A by Yang discloses an inorganic material coated phase-change microcapsule compounded phase-change putty as well as a preparation method and application thereof. Yang's inorganic coated phase-change microcapsule compounded phase-change putty comprises calcium magnesium powder, Portland cement, ash calcium powder and additives. Yang's inorganic material coated phase-change microcapsules are made of a nonflammable material, so that the inorganic material coated phase-change microcapsules are relatively high in safety when being compared with an organic material coated phase-change microcapsules. The inorganic material coated phase-change microcapsule compounded phase-change putty maintains properties of the original putty, furthermore has an indoor temperature conditioning function, and has the characteristics that indoor temperature fluctuation is reduced and energy consumption is reduced. The indoor temperature of a house with inner walls made of the phase-change putty can be controlled to 2-4 DEG C, and thus a good heat-preservation temperature is achieved However, Yang's inorganic component comprises 25 to 35 wt. % $CaCO_3$ and 15 to 20% $MgCO_3$, and it may include an anti-foaming agent selected from the group consisting of polyether, silicone, and alcohol antifoaming agents, such as GP type glycerol polyether, GPE type polyoxyethylene polyoxypropylene glyceryl ether, etc.. However, Yang additionally requires at least one of $SiO_2$, $TiO_2$, $SnO_2$, $ZrO_2$, and $Al_2O_3$. Also, Yang selects an organic portion from low MW alcohols, organic acids, esters, and alkanes, such as glycerol, butanol, dodecanol, tetradecanol, cetyl alcohol, and/or erythritol; caprylic acid, capric acid, dodecanoic acid, myristic acid, palmitic acid, octadecanoic acid, lauric acid, myristic acid, palmitic acid, and/or stearic acid; cellulose laurate and/or cetyl stearate; or a paraffin wax (MP: 14 to 80° C.), aromatic hydrocarbon, and/or aliphatic hydrocarbon (carbon number: 8 to 100). Yang requires in its PCMs a portion of Portland cement, a hydraulic material with at least ⅔ by mass of calcium silicates and a remainder of Al- and Fe-containing clinker phases and other compounds, i.e., $(CaO)_3.SiO_2$ (45 to 75%), $(CaO)_2.SiO_2$ (7 to 32%), $(CaO)_3.Al_2O_3$ (0 to 13%), $(CaO)_4.Al_2O_3.Fe_2O_3$ (0 to 18%), and $CaSO_4.2H_2O$ (2 to 10%), wherein typical components by percent are CaO (61 to 67%), $SiO_2$ (19 to 23%), $Al_2O_3$ (2.5 to 6%), $Fe_2O_3$ (0 to 6%), and $SO_3$ (1.5 to 4.5%). Yang's ratio of CaO to $SiO_2$ is at least 2.0, and its MgO content is below 5.0 wt %. Yang does not describe PEG or similar polymers, and, while describing $MgCO_3$ and $CaCO_3$ separately, Yang fails to explicitly describe $Ca^{2+}$-doped $MgCO_3$. Further, Yang is silent on such a porous matrix of calcium ion doped magnesium carbonate, encapsulating PEG in a PCM.

WO 2013/077379 A1 by Morita discloses a heat storage material that maintains a stable particle diameter even with repeated phase changes, capable of withstanding long-term use. Morita's heat storage material is obtained by dispersion of particles containing a heat storage substance and an elastomer. Morita's heat storage material comprises at least one heat storage substance selected from paraffin compounds, fatty acids, ester compounds of fatty acids, aliphatic ethers, aliphatic ketones, and aliphatic alcohols.

However, Morita requires an elastomer with a molecular weight of at least 10,000 g/mol, as well as a paraffin, fatty acid, aliphatic ether, aliphatic ketone, or fatty alcohol as heat storage material. While Morita may disclose the use of a pegylated-ether surfactant, polyoxyethylene stearyl ether, Morita does not indicate its chain length nor does Morita employ its surfactant in heat storage—rather to emulsify its heat storage material. Although Morita may allow the presence of $CaCO_3$ or $MgCO_3$ as optional fillers, Morita fails to describe using $MgCO_3$ as a PCM, particularly not as a composite of PEG encapsulated in a porous matrix of calcium ion doped $MgCO_3$.

Karaman et al.'s article in *Solar Energy Materials and Solar Cells* 2011, 95(7), 1647-1653, discloses the preparation, characterization, and determination of thermal energy storage properties of polyethylene glycol (PEG)/diatomite (also referred to as diatomaceous earth or kieselguhr) composite as a novel form-stable composite phase change material (PCM). Karaman's composite PCM was prepared by incorporating PEG in the pores of diatomite. The PEG could be retained by 50 wt % into pores of the diatomite without the leakage of melted PEG from the composite. Karaman characterizes its composite PCM using SEM and FT-IR analysis, and determines thermal properties of the composite PCM by differential scanning calorimetry (DSC). DSC results showed that the melting temperature and latent heat of Karaman's composite PCM are 27.70° C. and 87.09 J/g, respectively. Thermal cycling test on the thermal reliability of Karaman's composite PCM showed that Karaman's composite PCM had good thermal reliability and chemical stability. Thermogravimetry (TG) analysis showed that the impregnated PEG into the diatomite had good thermal stability. Thermal conductivity of Karaman's composite PCM was improved by adding expanded graphite in different mass fractions. Thermal energy storage of Karaman's composite PCM was also tested.

However, Karaman does not teach the use of $MgCO_3$, doped or otherwise, in a PCM and more particularly fails to describe a phase change composite of PEG encapsulated in a porous matrix of calcium ion doped magnesium carbonate.

Gutierrez et al. in *Applied Energy* 2015, 154, 616-621, discloses evaluating bischofite (hydrous magnesium chloride mineral with formula $MgCl_2.6H_2O$), a by-product of the non-metallic mining industry, as phase change material in thermal energy storage. Gutierrez indicates that bischofite shows little cycling stability, therefore studies the mixture with an additive. Gutierrez discloses that polyethylene glycol (PEG) is a PCM itself, and uses PEG (with different molecular weights) as an additive in a bischofite PCM to improve its thermal behavior.

However, Gutierrez does not teach the use of $MgCO_3$, doped or otherwise, in a PCM and more particularly fails to describe a phase change composite of PEG encapsulated in a porous matrix of calcium ion doped magnesium carbonate.

Hao et al.'s article in *Thermochimica Acta* 2015, 604, 45-51 discloses synthesizing porous MgO material with ultrahigh surface area. A composite PCM was prepared from PEG-1000 and the porous MgO, the phase change temperatures and enthalpy of the composite were measured and analyzed,. Hao's mesoporous magnesium oxide (MgO) material was synthesized using an integration of the evaporation-induced surfactant assembly and magnesium nitrate pyrolysis. Hao's as-prepared MgO material is crystalline, and possesses three-dimensional interconnected mesopores and a surface area as high as 596 $m^2$/g. Hao fabricates a shape-stabilized phase change composite of PEG/MgO using the porous MgO as a matrix and polyethylene glycol (PEG-1000) as the functional phase for heat energy storage. Compositions and microstructures of Hao's PEG/MgO composite were determined by Fourier transformation infrared spectroscope (FT-IR), X-ray diffractometer (XRD), scanning electronic microscope (SEM), and thermogravimetric analysis (TGA). Phase change properties of Hao's PEG/MgO composite were determined by differential scanning calorimeter (DSC).

However, Hao does not teach the use of $MgCO_3$, doped or otherwise, in a PCM and fails to describe a phase change composite of PEG encapsulated in a porous matrix of calcium ion doped magnesium carbonate.

Wen et al in *J of Thermal Analysis and calorimetry* 2018, 132(3), 1753-1761 discloses using bone char (BC, consisting mainly of $Ca_3(PO_4)_2$ or hydroxyapatite ($Ca_5(PO_4)_3$(OH)) in 57 to 80%, $CaCO_3$ in 6 to 10%, and carbon in 7 to 10%) as a porous material useful for preparing a form-stable composite phase change material (PCM). A polyethylene glycol (PEG 6000)/BC composite PCMs was prepared by impregnation. The PEG was used as the phase change material, and two different particle sizes of BC (0.8-1 mm: BC-1; 0.25-0.8 mm: BC-2) were used as the supporting materials. The phase composition and chemical structure of Wen's composite PCMs (PEG/BC-1 and PEG/BC-2) were characterized using X-ray diffraction and Fourier transformation infrared. Thermal properties and thermal stability of Wen's composite PCMs were determined by differential scanning calorimeter (DSC) and thermogravimetric analysis (TGA). DSC results showed that the maximum impregnation percentage for PEG into BC-1 and BC-2 was 38.77 and 43.91%, respectively, without melted PCM seepage from the composites. The TGA analysis revealed that Wen's composite PCMs had good thermal stability above their working temperature range. The thermal cycle test of 100 melting-freezing cycles showed that the composite PCMs have good thermal reliability and chemical stability. The form-stable composite PCMs can be used as thermal energy storage material for waste heat storage and solar heating system.

However, Wen does not teach the use of $MgCO_3$, doped or otherwise, in a PCM and more particularly describe a phase change composite of PEG encapsulated in a porous matrix of calcium ion doped magnesium carbonate.

$MgCO_3$ is difficult to prepare properly under ambient conditions. Known methods of synthesizing $MgCO_3$, e.g., produce $MgCO_3$ successfully, have certain deficiencies. For example, microscale particles from these methods may be too small to satisfy the basic requirements of micro-analysis, including micro-constitution and micro-composition analysis. Thus, new methods of $MgCO_3$ synthesis with simplified processes and good efficiency are worth exploring.

PEG leakage problem is a significant problem that has remained unsolved by encapsulating PEG in a metal or alloy for reason including encapsulation alone can cause problematic supercooling. Moreover, PCM encapsulation is a complicated and laborious process. By contrast, shape stabilization is advantageous for the preparation of PCMs, causing little or no supercooling, and avoiding cell formation. Shape stabilization processing materials with a high compatibility and good absorption may be used to capture a PCM and guarantee the stability and even distribution of a PCM. Shape stabilization can be low cost and applicable to higher percentage of PCM than encapsulation. However, known inorganic porous support-based shape stabilization processes have been limited, mainly relying on noble inorganic materials.

Aspects of the invention may address one or more of the above-described shortcomings of the art.

SUMMARY OF THE INVENTION

Aspects of the invention provide a phase change composite, comprising: an organic component comprising, based on total organic mass, at least 75 wt % of a thermoplastic polymer; and an inorganic porous matrix comprising, based on total inorganic mass, at least 50 wt % calcium ion doped magnesium carbonate, wherein at least a portion of the organic component is encapsulated in the porous matrix. All modifications and substitutions as detailed herein, except where otherwise specified, may be combined or permuted within the scope of the invention The thermoplastic polymer may comprise a polyether, such as polyethylene glycol, polypropylene glycol, polyoxetane, or a mixture of two or more of any of these, preferably at least polyethylene glycol, especially PEG-6000. The thermoplastic polymer may have a number-average molecular weight in the range of from 1,000 to 50,000, 1,000 to 50,000, 2,500 to 10,000, or 4,000 to 8,000. The organic component may comprise at least 90 or 95 wt. % or more polyethylene glycol.

The porous matrix may comprise from 2.5 to 20, 5 to 17.5, 10 to 15, or at least 10 mol % calcium ions. The inorganic mass may comprise at least 90 wt % calcium ion doped magnesium carbonate. The inorganic porous matrix may have a BET specific surface area in a range of from 14 to 20 $m^2$/g.

Composites according to the invention may have an apparent melting enthalpy in a range of from 400 to 600 J/g. Composites within the scope of the invention may have a thermal storage efficiency in a range of from 125 to 250%.

Composites within the scope of the invention may have no visible impurities in their DSC scans after at least 50 cycles.

Aspects of the invention provide heat storage systems having one or more of any of the phase change composites described herein.

Aspects of the invention provide methods of preparing any inventive phase change composite described herein, preferably a composite comprising polyethylene glycol (PEG) encapsulated in a porous matrix. The method may comprise: dissolving magnesium nitrate, calcium nitrates, and ammonium carbonate in water to form a solution; stirring the solution at constant pH in the range of 7.5 to 9.5 for 6 to 18 hours; heating the solution at a temperature in the range of 150 to 250° C. for 12 to 48 hours to produce mesoporous calcium ion doped magnesium carbonate; mixing the mesoporous calcium ion doped magnesium carbonate with an alcoholic solution of PEG and stirring for a time in the range of 2 to 8 hours; and evaporating the alcohol to produce the composite of PEG encapsulated in a mesoporous matrix calcium ion doped magnesium carbonate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
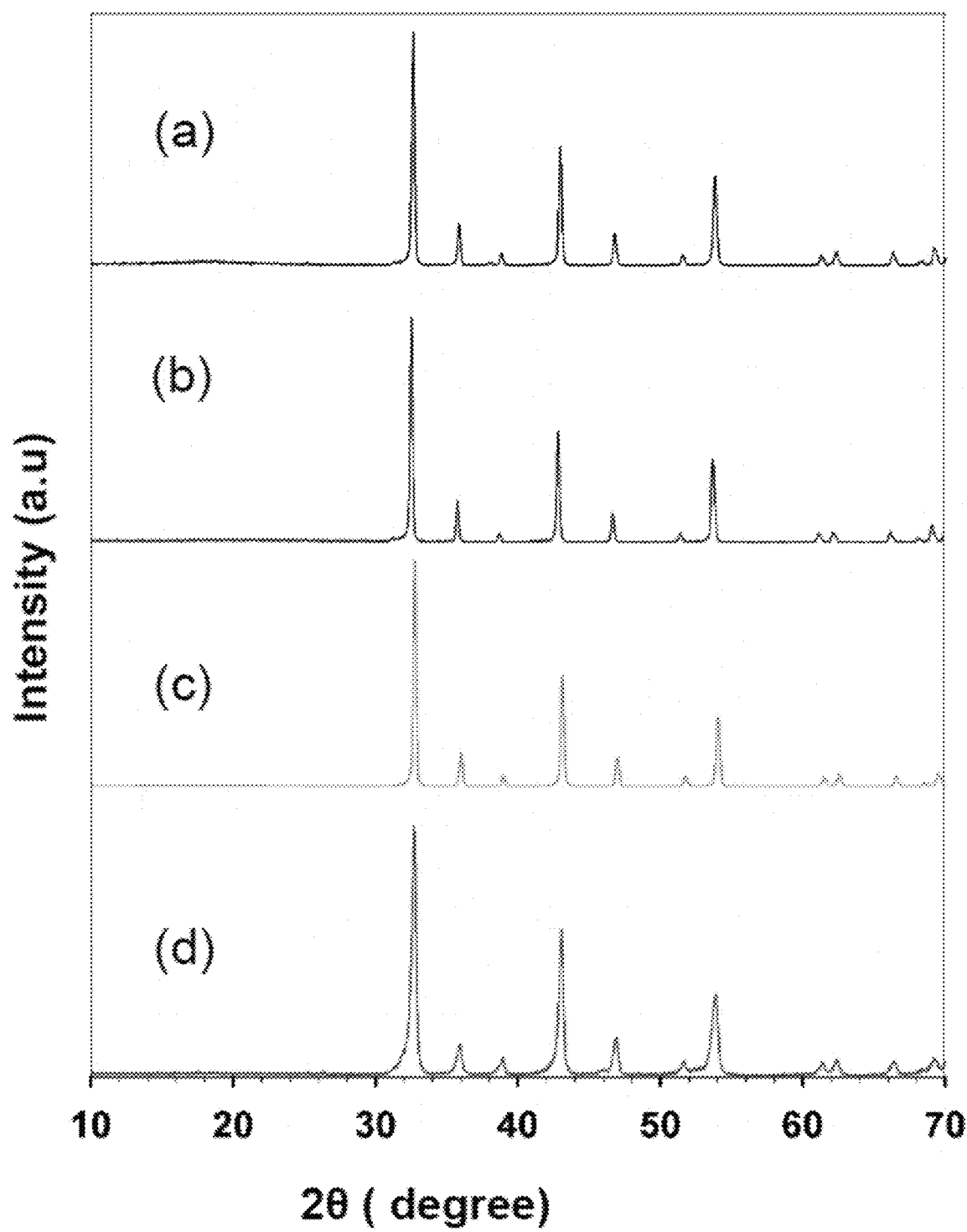
FIG. 1A (a) shows an x-ray diffraction (XRD) pattern of $MgCO_3$, (b) shows an XRD pattern of 5 mol % $Ca^{2+}$-doped $MgCO_3$; (c) shows an XRD pattern of 10 mol % $Ca^{2+}$-doped $MgCO_3$; (d) shows an XRD pattern of 15 mol % $Ca^{2+}$-doped $MgCO_3$.

Aspects of the invention phase change composites which may comprise: an organic component comprising, based on total organic mass, at least 75, 80, 85, 90, 92.5, 95, 96, 97, 98, 99, 99.5, or 99.9 wt % of a thermoplastic polymer; and an inorganic porous matrix comprising, based on total inorganic mass, at least 50, 60, 75, 85, 90, 92.5, 95, 96, 97, 98, 99, 99.5, or 99.9 wt % calcium ion doped magnesium carbonate, wherein at least a portion of the organic component is encapsulated in the porous matrix. "Organic mass," as used herein, does not include carbon that is contained in ionic counter ions of inorganic materials such as carbonate.

Thermoplastic polymers within the scope of the invention may comprise a polyether, such as polyethylene glycol, polypropylene glycol, polyoxetane, or a mixture of two or more of any of these, preferably at least polyethylene glycol, especially PEG-6000. Useful polymers may include polyethers, polyesters, polyolefins, polyurethanes, poly (meth)acrylates, polyamides, polyimides, and even sparingly cross-linked elastomers. It may also be desirable to at least partially exclude elastomers in particular, and any other named polymer class in general. Particularly useful polymers are presently include polyethers, including polyethylene glycol (PEG), polypropylene glycol (PPG), polyoxetane, poly-1,2-butylene glycol, poly-tetrahydofuran, etc.. Forms of PEG useful in the inventive composites may be any chain length, though preferably at least 1000 g/mol, such as PEG-1000, PEG-1450, PEG-1500, PEG-2000, PEG-3000, PEG-3350, PEG-4000, PEG-5000, PEG-6000, PEG-8000, PEG-10000, PEG-12000, PEG-20000, or PEG-25000, for example.

Useful thermoplastic polymers may have a number-average molecular weight in the range of from 1,000 to 50,000, 1,000 to 50,000, 2,500 to 10,000, or 4,000 to 8,000, which may be tailored by application. Inventive composites may, but need not, exclude monomeric organic acids and may use higher MW materials than paraffin waxes, e.g., of at least 1,000, 1,250, 1,500, 1,750, 2,000, 2,500, 3,000, 4,000, or 5,000 g/mol substantially thermoplastic polymers. Useful molecular weights, depending upon application may be in a range of from 1,000 to 1,000,000, 1,250 to 750,000, 1,500 to 500,000, 2,000 to 250,000, 2,500 to 200,000, 3,000 to 175,000, 3,500 to 150,000, 4,000 to 125,000, 4,500 to 100,000, 5,000 to 75,000, 5,250 to 50,000, or 5,500 to 35,000 g/mol. A preferable MW may be less than 10,000 g/mol.

The organic component may comprise at least 50, 65, 75, 85, 90, 92.5, 95, 96, 97, 98, 99, 99.5, or 99.9 wt. % or more of the thermoplastic polymer(s), particularly polyethylene glycol. Composites within the scope of the invention may comprise at least 5, 7.5, 10, 12.5, 15, 17.5, or 20 wt % polymer component, based on the total composite mass, and will generally comprise less that 75, 65, 50, or 40 wt % polymer. Useful polymers will generally have a polydispersity index (PDI) in a range of from 1.1 to 7, 1.2 to 5, 1.25 to 4, or 1.3 to 3, and generally under 10, though it may exceed 10 under the appropriate binding/adhesion conditions.

The porous matrix may comprise from 0.5 to 40, 1 to 30, 2.5 to 20, 5 to 17.5, 10 to 15 mol % alkaline earth metal ions, esp. calcium ions, or at least 5, 7.5, 10, 12.5, 15, 17.5, or 20 mol % alkaline earth metal ions, and may have no more than 75, 50, or 25 mol % alkaline earth metal ions. Inorganic components of composites according to the invention generally include alkaline earth metal ions, particularly $Mg^{2+}$, $Ca^{2+}$, $Sr^{2+}$, and/or $Ba^{2+}$, which are generally present as salts, particularly carbonate salts, and/or as dopants in carbonate salt lattices. The inorganic component may be at least 50, 60, 70, 80, 85, 90, 91, 92, 93, 94, 96, 97, 98 or more wt % calcium ion doped magnesium carbonate Based on the total inorganic mass, composites within the scope of the invention may have less than 70, 50, 40, 33, 25, 20, 15, 12.5, 10, 7.5, 5, 4, 3, 2.5, 2, 1, or even 0.5 wt % of $SiO_2$, $TiO_2$, $SnO_2$, $ZrO_2$, and/or $Al_2O_3$ amongst the inorganic components, and may even be devoid of any such oxides (including silicates) beyond inevitable traces. Composites within the scope of the invention may largely exclude, e.g., less than 10, 5, 2.5, or 1 wt %, or completely exclude, e.g., kaolin, Portland cement, bischofite, hydroxyapatite, and/or diatomaceous earth in their inorganic matrices, though these materials can be tolerated as fillers and/or diluents. No, or at least less than 10, 5, 2.5 wt %, surface-modified inorganic materials, i.e., covalently bonded surface modifications, such as attaching functional groups, are needed in composites within the scope of the invention, though surface-modified materials may be used, as desired, or limited to no more than 50, 40, 33, 25, 10, 5, or 2.5 wt % of the inorganics. The inorganic portion in the composites within the scope of the invention may limit MgO to less than 15, 10, 5, 2.5, 1, or 0.5 wt % of the inorganics. The organic portion in the composites within the scope of the invention may limit elastomeric and/or cross-linked components to less than 15, 10, 5, 2.5, 1, or 0.5 wt % of the organic portion. Although the composite can take many physical forms, it will preferably be a non-fluid and/or non-emulsified solid.

Synthetic Method (Hydrothermal Method)

Composites within the scope of the invention can be made using, e.g., reagent-grade polyethylene glycol with an average molecular weight of 6000 (PEG-6000, available from the Guangzhou Chemical Agent Company (Guangzhou, China)); $Ca^{2+}$ nitrate salts, magnesium nitrate hexahydrate ($Mg(NO_3)_2.6H_2O$), and abs. ethanol (available from Shanghai Sinopharm Chemical Reagent Co., Ltd.); and ammonium carbonate (available from Sigma-Aldrich). Other alkaline earth metal ions may alternately be used such as $Be^{2+}$, $Ca^{2+}$, $Sr^{2+}$, and/or $Ba^{2+}$. Further cations, such as alkali metals (e.g., $Na^+$, $K^+$, $Li^+$, and/or $Cs^+$), and/or cations of Ti, Zr, Cr, Mo, Mn, Fe, Ru, Os, Co, Rh, Ni, Pd, Pt, Cu, Ag, Au, Zn, Cd, and/or Sn (particularly Mn, Fe, CO, Ni, Cu, Ag, Zn, and/or Cd) may be added depending upon the desired application. These cations are typically introduced in forms which are water soluble but wherein the metal cation can be separated, preferably by (co)precipitation from the anion. Examples of useful anions may be halides, such as chlorides or bromides, nitrates, citrates, tartrates, or the like.

Appropriate amounts of $Mg^{2+}$ and $Ca^{2+}$ nitrate salts can be dissolved separately in deionized water. Exemplary molar ratios of $Ca^{2+}$ to $Mg^{2+}$ may be in ranges having lower endpoints of 1:100, 1:50, 1:30, 1:25, 1:20, or 1:10, and/or upper end points of 1:1, 1:2, 1:3, 1:4; 1:5, 1:6, 1:7, 1:8, 1:9, or 1:10. A corresponding amount of a $(NH_4)_2CO_3$ solution (4.1 mol/cc, available from Merck) can be added to the $Mg^{2+}$ and $Ca^{2+}$+ nitrate solutions to co-precipitate the metallic ions. The pH of the solutions can be maintained at 8.5 and/or adjusted to a specific value by adding $NH_3.H_2O$ (25 wt %) or $HNO_3$ (1 M). Useful pHs are usually at least neutral or basic, but may be in a range of from 6.5 to 10.5, 7 to 10, 7.1 to 9.5, 7.5 to 9, 8 to 8.8, 8.25 to 8.75, or 8.4 to 8.6. The solutions are preferably kept at pH ~8.5 and stirred vigorously 12 hours. This stirring may be conducted for more or less time as determined by the reaction extent, but acceptable reaction times may be in a range of from 5 to 24, 8 to 16, or 10 to 14 hours. Each precursor suspension is transferred to a plastic container with an inner volume of 500 cm³. The plastic container is inserted into a steel vessel, and the mouth of the vessel is closed. The hydrothermal reaction then proceeds at 200° C. over 24 hours. The hydrothermal reaction should generally be conducted at least at 160° C. for at least 24 hours, but acceptable reaction temperature ranges are from 150 to 280, 160 to 260, 175 to 250, 185 to 230, or 190 to 225° C. Reaction times at any of these temperatures may be at least 18, 20, 24, 28, 30, 36, or 48 hours and may be terminated, after completion of the reaction, which maybe before 7, 6, 5, 4, 3, 2.5, 2, 1.5, or 1 day. The resulting powders are washed with deionized water and alcohol, followed by drying at 120° C. The shape, size, and make-up of the inorganic component can be adjusted by varying synthesis conditions, including pH, temperature, pressure, and chemical compositions. Potential inorganic crystal shapes and sizes are discussed below.

An exemplary preparation of a shape-stabilized composite PCM is as follows. 0.5 g of PEG-6000 was dissolved in 80 mL absolute ethanol. 0.2 g of mesoporous 15 mol % $Ca^{2+}$-doped $MgCO_3$ was then added to the ethanolic PEG-6000 solution. After stirring for 4 h, the ethanol was evaporated at 80° C. for 24 h. The PEG-6000/15 mol % $Ca^{2+}$-doped $MgCO_3$ composite PCM was collected for further characterization.

The hydrothermal method of manufacturing the inorganic component of the composites within the scope of the invention can involve, under alkaline conditions, hydrolyzing urea (or $(NH_4)_2CO_3$) to yield $NH_4^+$ and $CO_3^{2-}$, as indicated in Equation 1 below.

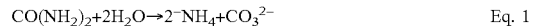

$$CO(NH_2)_2 + 2H_2O \rightarrow 2^-NH_4 + CO_3^{2-} \qquad \text{Eq. 1}$$

Under the hydrothermal conditions, $Mg^{2+}$, $Ca^{2+}$, $OH^-$, $CO_3^{2-}$, $NO_3^{2-}$, and $NH_4^+$ coexist in the aqueous reaction system. The temperature is slowly raised from 25 to 200° C., and the pH is preferably adjusted to 8.5. $NO_3^-$ ions can be removed, e.g., by filtration after competitive crystallization. $CaMg_5(CO_3)_4(OH)_2.4H_2O$ can be obtained at 80° C. in the presence of $Mg^{2+}$, $Ca^{2+}$, $OH^-$, and $CO_3^{2-}$. Moreover, $Mg_5(CO_3)_4(OH)_2.4H_2O$, $Mg(OH)_2$, and $Ca(OH)_2$ can be observed at 160° C. for reaction times shorter than 30 hours. $CaMg_5(CO_3)_4(OH)_2.4H_2O$ may provide magnesium for synthesizing $MgCO_3$, and $Ca^{2+}$ may be substituted into $MgCO_3$. However, at reaction temperatures above 160° C. and reaction times greater than 30 hours, $CaMg_5(CO_3)_4(OH)_2.4H_2O$ generated during this process may be converted into MgCO$_3$. Relevant chemical reactions may be represented by Equations 2 to 4, below.

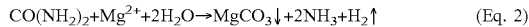

$$CO(NH_2)_2 + Mg^{2+} + 2H_2O \rightarrow MgCO_3\downarrow + 2NH_3 + H_2\uparrow \quad (Eq.\ 2)$$

$$CO_2 + H_2O \rightarrow CO_3^{2-} + 2H^+ \quad (Eq.\ 3)$$

$$Mg^{2+} + CO_3^{2-} \rightarrow MgCO_3 \quad (Eq.\ 4)$$

At 160° C., the Gibbs free energy of the reaction)($\Delta_f G°$) is −469.41 kJ/mol, i.e., the reaction is thermodynamically spontaneous at the reaction temperature. This reaction was exothermic, with an enthalpy of $\Delta_f H° = -309.17$ kJ/mol. Consequently, this reaction is thermodynamically predicted to proceed readily at 160° C.

Referring now to the drawings, wherein like reference numerals designate identical or corresponding parts throughout the several views.

FIG. 1A(a) shows the XRD pattern of MgCO$_3$ synthesized as described herein. FIG. 1A (b) shows the XRD pattern of 5 mol % Ca$^{2+}$-doped MgCO$_3$. FIG. 1A(c) shows the XRD pattern of 10 mol % Ca$^{2+}$-doped MgCO$_3$. FIG. 1A(d) shows the XRD pattern of 15 mol % Ca$^{2+}$-doped MgCO$_3$. The samples in these figures were identified by XRD as single-phase MgCO$_3$ without any impurities. The lattice constants calculated from the pattern (a=4.63, Å, c=14.93 Å) were compatible with reported values (a=4.633 Å, c=15.015 Å). The diffraction peaks could be indexed as hexagonal phase rhomb-centered MgCO$_3$, in good agreement with the Joint Committee on Powder Diffraction Standards (JCPDS) No. 08-0479.

The intensities of the sharp peaks in FIG. 1A(a) to (d) indicate that the MgCO$_3$ was highly crystalline. The addition of Ca$^{2+}$ had no significant effect on the MgCO$_3$ crystal structure, as shown in FIG. 1A(a) to (d). The XRD patterns remain substantially identical, even after the addition of 15 mol % Ca$^{2+}$, compared to patterns collected from MgCO$_3$ alone. The XRD patterns displayed the same peaks in FIG. 1A(c), after the addition of 10 mol % Ca$^{2+}$, and in FIG. 1A(d), after the addition of 15 mol % Ca$^{2+}$. CaCO$_3$ and MgCO$_3$ reportedly have the same structure as MnCO$_3$, FeCO$_3$, and (Mn,Fe)CO$_3$. However, the substitution of Ca$^{2+}$ for Mg$^{2+}$ in MgCO$_3$, or of Mg$^{2+}$ for Ca$^{2-}$ in CaCO$_3$, produces an ordered CaMg(CO$_3$)$_2$ structure that accommodates the difference between the ionic radii of Ca$^{2+}$ (r=1.14 A) and Mg$^{2+}$ (r=0.86 A). The new structure forms alternating layers with Ca$^{2+}$ and Mg$^{2+}$ ions. In the Ca$^{2+}$ layer, the Ca—O interatomic distance is 2.390 A, and in the Mg layer, the Mg—O distance is 2.095.

The X-ray diffraction (XRD) patterns of the samples were obtained out using an X-ray diffractometer (Shimadzu XRD-6000) with graphite monochromatized Cu-Kα radiation, operated at 40 kV and 30 mA. The morphology and microstructures of the MgCO$_3$ material and PEG/MgCO$_3$ composite were observed using a field emission scanning electron microscope (FESEM, JEOL JSM-6700F, Japan). The specific surface area and pore size distribution of the mesoporous 15 mol % Ca$^{2+}$-doped MgCO$_3$ material were measured using a specific surface area analyzer (Micromeritics ASAP 2020 V4.01 E, USA). The Fourier transform infrared (FT-IR) spectra were recorded using a Thermo Nicolet 380 from 400 to 4000 cm$^-$ using KBr pellets prepared by pressing pellets containing 100 mg KBr and 1 mg sample. Thermogravimetric analysis (TGA) of about 10 mg samples was carried out using a Shimadzu TA-50 thermal analyzer at a heating rate of 10° C./min from room temperature to 600° C. under dry nitrogen. The phase change temperature and latent heat of the samples were measured using a differential scanning calorimeter (DSC, Q2000). DSC measurements were conducted by heating 10 mg samples sealed in an aluminum pan at a heating rate of 5° C./min under a constant stream of argon at a flow rate of 20 mL/min.

Figure 1B:
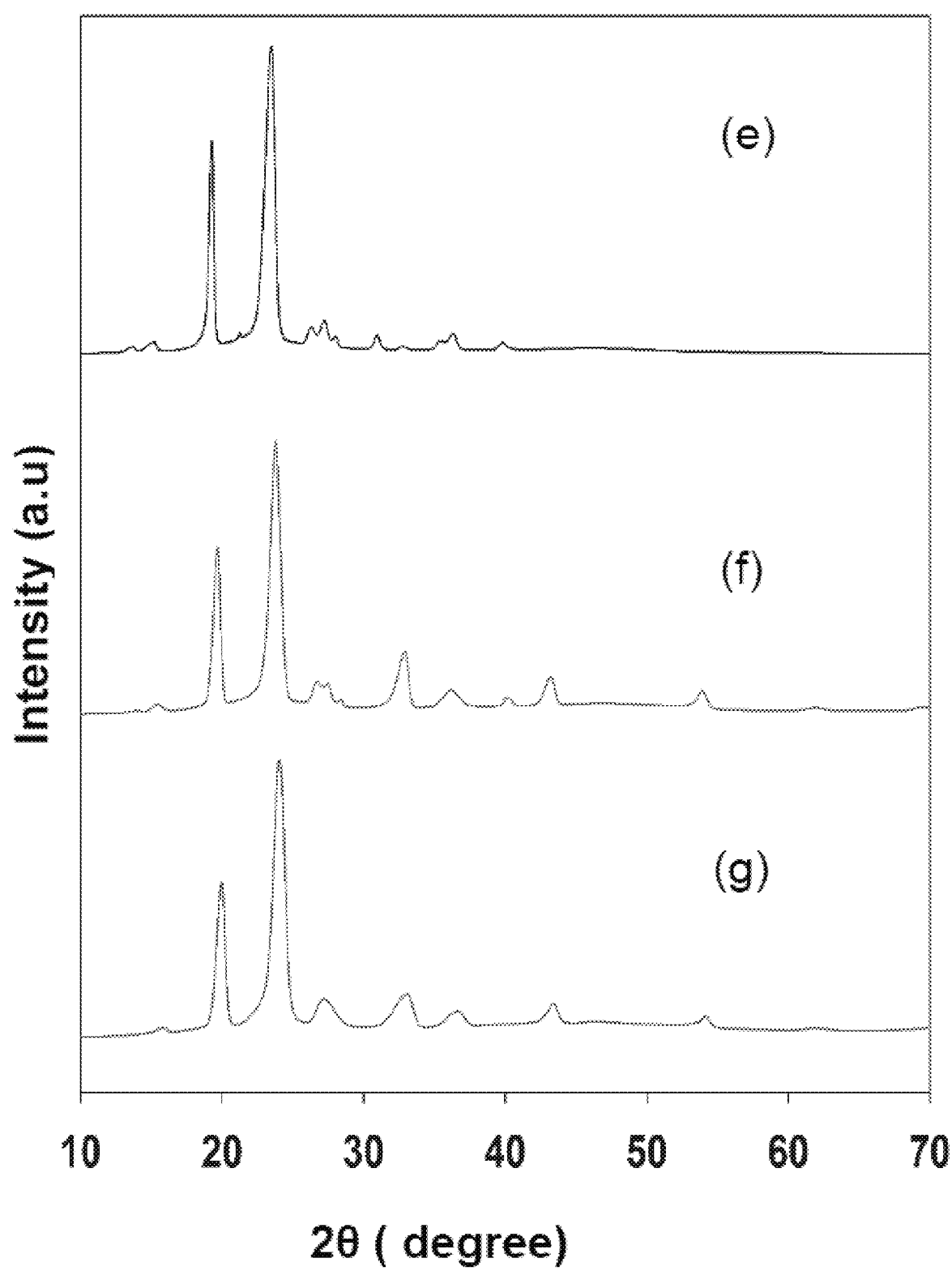
FIG. 1B (e) shows an XRD pattern of pure PEG-6000; (f) shows an XRD pattern of 10 mol % $Ca^{2+}$-doped $MgCO_3$ impregnated with PEG-6000; (g) shows an XRD pattern of 15 mol % $Ca^{2+}$-doped $MgCO_3$ impregnated with PEG-6000.

FIG. 1B(e) shows an XRD pattern of pure PEG-6000. FIG. 1B(f) illustrates the sample shown pure in FIG. 1A(c), but impregnated with PEG-6000. FIG. 1B(g) presents sample illustrates the sample shown pure in FIG. 1A(d), but impregnated with PEG-6000. The composites of PEG-6000 and Ca$^{2+}$-doped MgCO$_3$ in FIGS. 1B(f) and 1B(g) indicate diffraction peaks in the 2θ range of 15°30°, ascribed to characteristic diffractions of crystalline PEG-6000. The XRD patterns of the PEG-6000/10 mol % Ca$^{2+}$-doped MgCO$_3$ or PEG-6000/15 mol % Ca$^{2+}$-doped MgCO$_3$ composites included the diffraction peaks of both PEG-6000 and the MgCO$_3$ material, but the peak intensities of MgCO$_3$ were weaker compared with those of pure PEG-6000. Thus, the results illustrated in FIG. 1A(a) to 1B(g) confirm that the composite PCM was composed of PEG and MgCO$_3$, and no new peaks were observed.

Figure 2A:
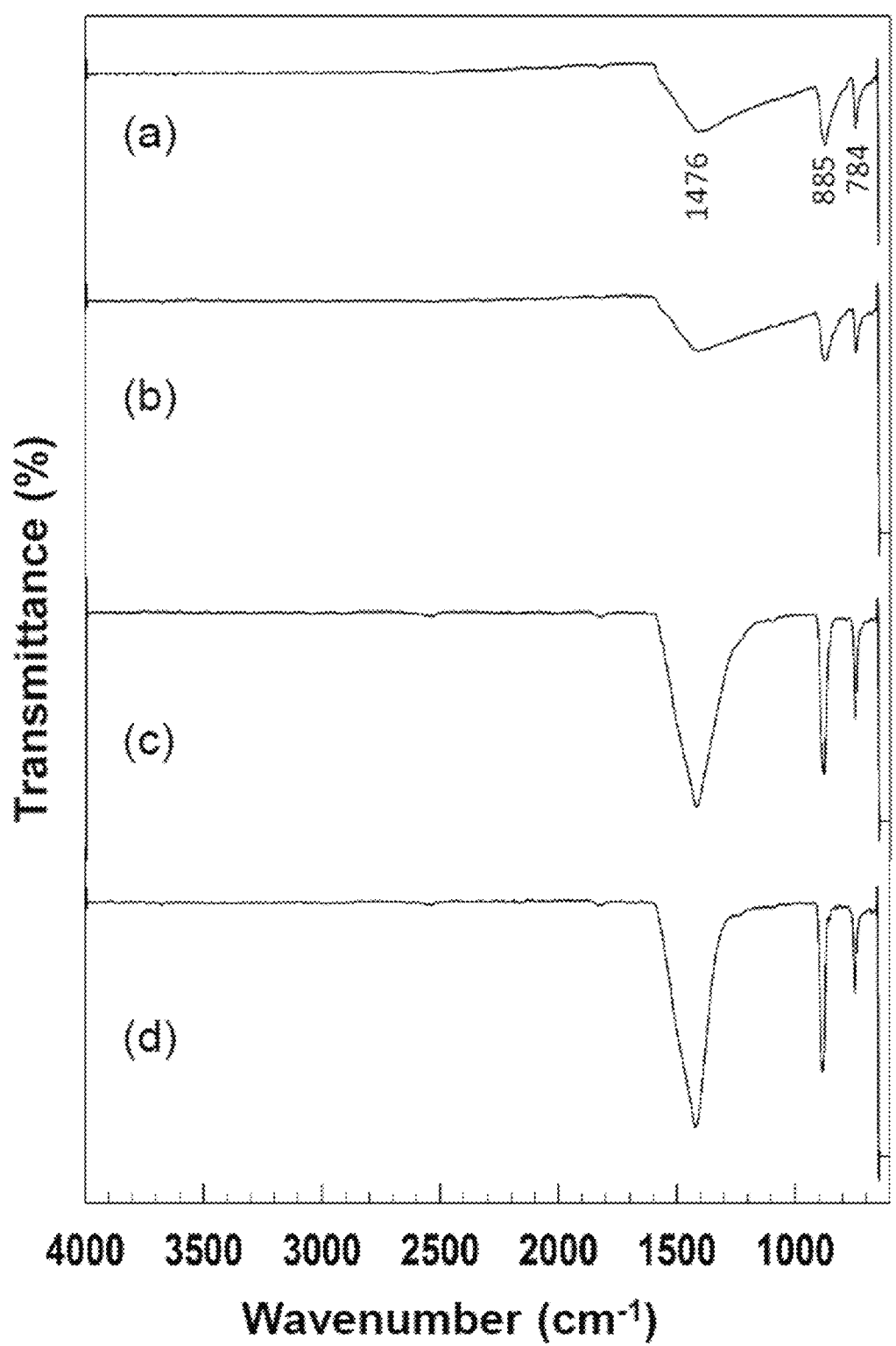
FIG. 2A (a)-(d) respectively show Fourier transform-infra red (FT-IR) spectra of (a) $MgCO_3$, (b) 5 mol % $Ca^{2+}$-doped $MgCO_3$, (c) 10 mol % $Ca^{2+}$-doped $MgCO_3$, (d) 15 mol % $Ca^{2+}$-doped $MgCO_3$, FIG. 2B (e) PEG-6000, (f) PEG-6000/$MgCO_3$, (g) PEG-6000/5 mol % $Ca^{2+}$-doped $MgCO_3$, (h) PEG-6000/10 mol % $Ca^{2+}$-doped $MgCO_3$, and (i) PEG-6000/15 mol % $Ca^{2+}$-doped $MgCO_3$.

FIG. 2A presents FT-IR spectra of (a) MgCO$_3$, (b) 5 mol % Ca$^{2+}$-doped MgCO$_3$, (c) 10 mol % Ca$^{2+}$-doped MgCO$_3$, and (d) 15 mol % Ca$^{2+}$-doped MgCO$_3$, each synthesized as described herein. The peaks at 3442 cm$^{-1}$ are attributed to the stretching vibration of water molecules and a hydroxyl group. This peak was not observed in MgCO$_3$ alone, and the 3442 cm$^{-1}$ peak was not observed even after the addition of 15 mol % Ca$^{2+}$ to MgCO$_3$. The spectrum of neat MgCO$_3$ exhibited strong absorption bands at 1476, 885, and 748 cm$^{-1}$, assigned to the asymmetric C—O stretching vibrations of the anhydrous MgCO$_3$ phase. The weak absorption band at 855 cm$^{-1}$ was attributed to the bending modes of CO$_3^{2-}$.

Interactions between PEG and the supporting inorganic materials were characterized by FT-IR spectroscopy at room temperature, as shown in FIG. 2A(b). The FT-IR spectrum of PEG-6000 showed an absorption band at 3468 cm$^{-1}$ attributed to OH stretching vibrations. PEG-6000's spectrum included peaks at 2889 cm$^{-1}$ attributed to the aliphatic C—H stretching, peaks at 1464 and 1339 cm$^{-1}$ attributed to C—H bending vibrations, and peaks at 1278 and 1095 cm$^{-1}$ attributed respectively to O—H and C—O—H stretching vibrations. Pure PEG-6000 includes a peak at 1109 cm$^{-1}$ attributable to a C—O—C stretching vibration.

Figure 2B:
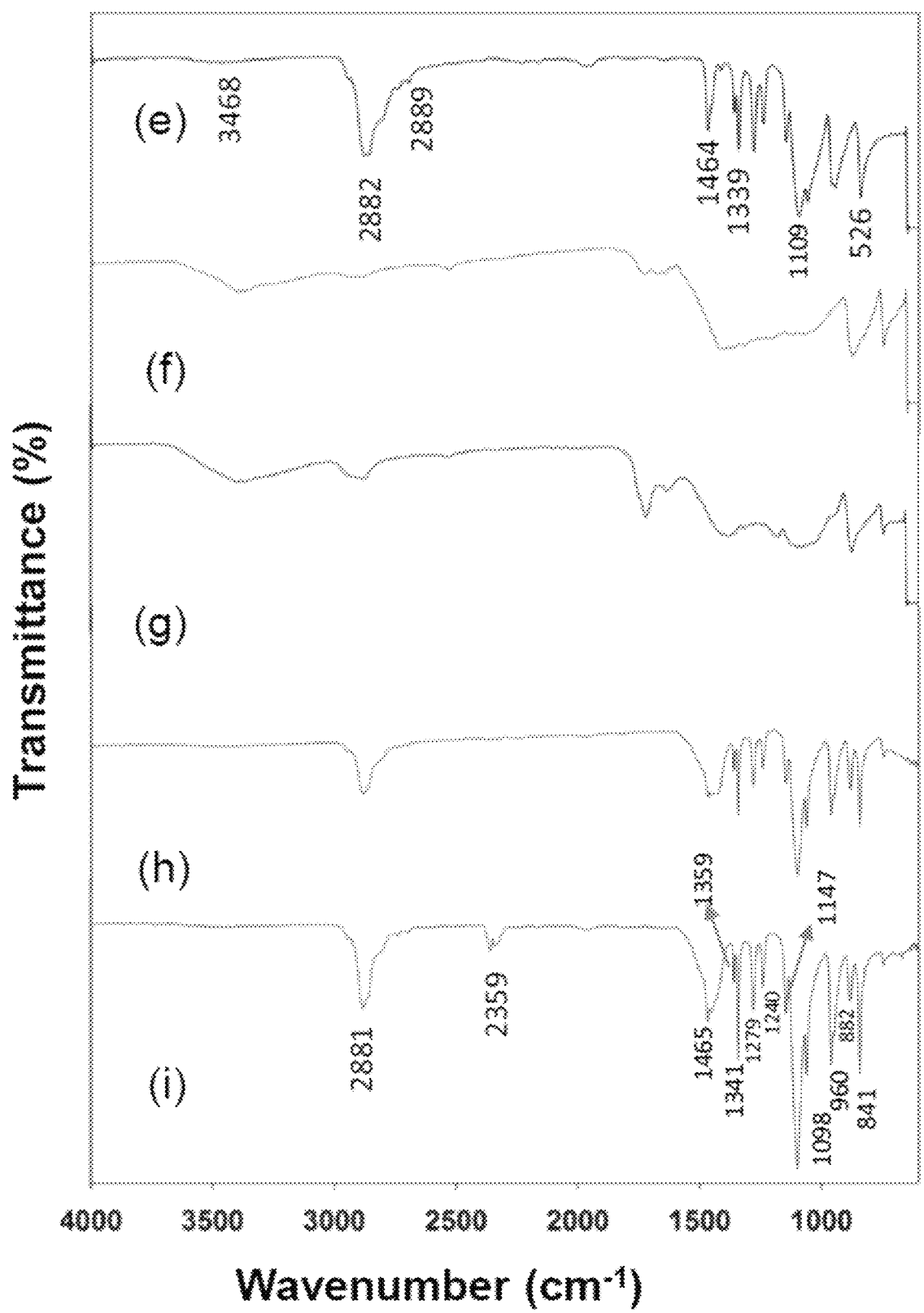

FIG. 2B(f) to (i), showing the composite PEG-inorganic spectra, reveal several peaks similar to those observed in the pure PEG spectral pattern. Some absorption peaks visible in the spectra of the PEG/(Ca)MgCO$_3$ composite PCM may be due to strong interactions and/or penetration of PEG into the (Ca)MgCO$_3$ support. Some shifts in absorption peaks can be observed, indicative of chemical bonding between the bridging oxygen atoms of Mg$^{2+}$ and CO$_3^{2-}$ and the hydroxyl group of PEG. This interaction may prevent leakage of liquid PEG from the CaMgCO$_3$ matrix.

Melting temperatures of inorganic supporting materials can be reduced through encapsulating an organic PCMs (e.g., palmitic acid) into inorganic shells, e.g., AlOOH, potentially due to the strong interface interactions between the core and shell. New peaks observed at 509 cm$^-$ in the spectra can be attributed to vibrations/stretching of coordination bonds between the CaMgCO$_3$ nanoparticles and the hydroxyl groups of PEG. The FT-IR data show that that PEG strongly interacts with the porous matrix. PEG and CaMgCO$_3$ displayed outstanding chemical compatibility, as confirmed by FT-IR.

Figure 3A:
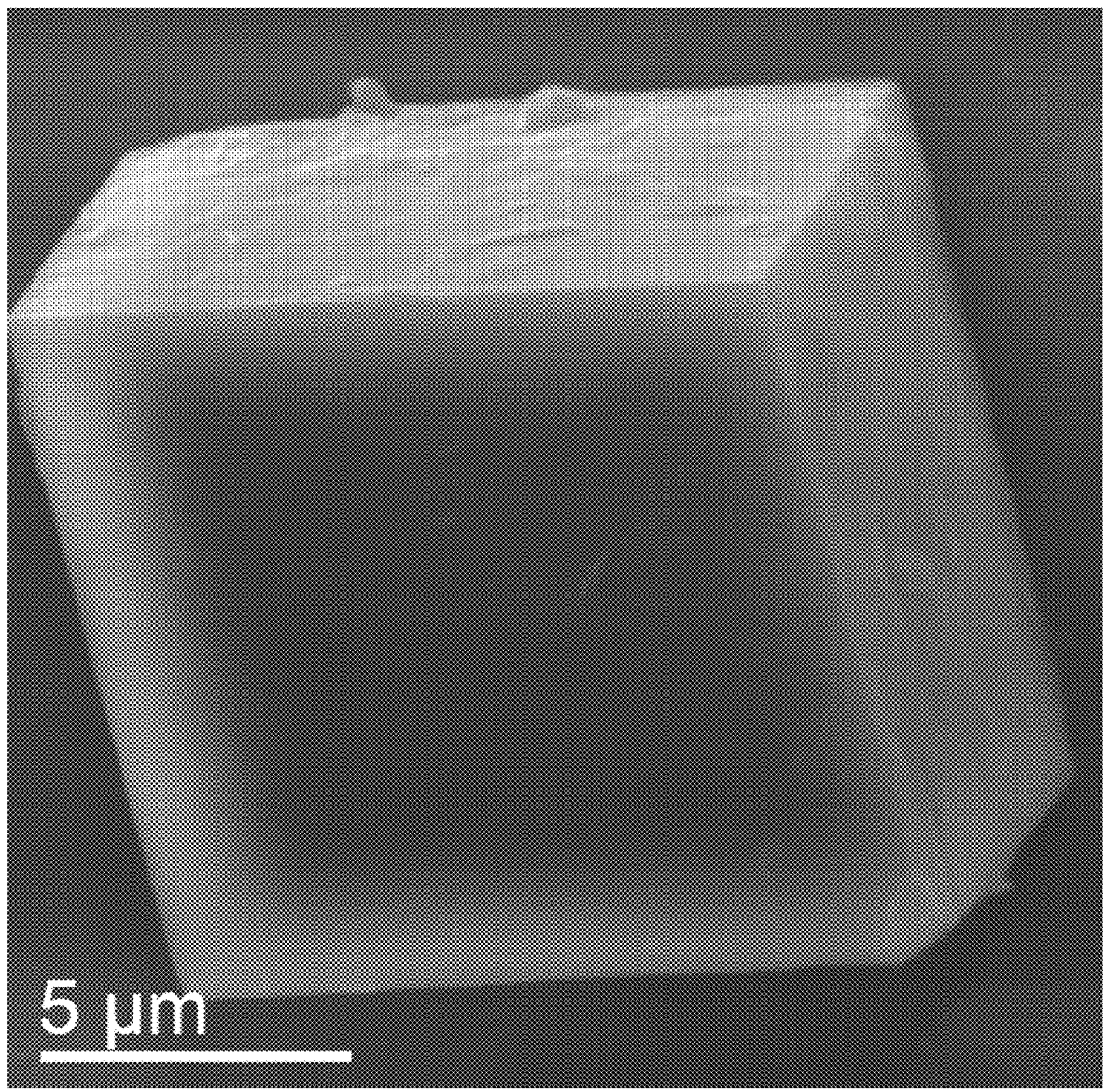
FIG. 3A shows a field emission scanning electron microscopy (FE-SEM) image of $MgCO_3$.
Figure 3B:
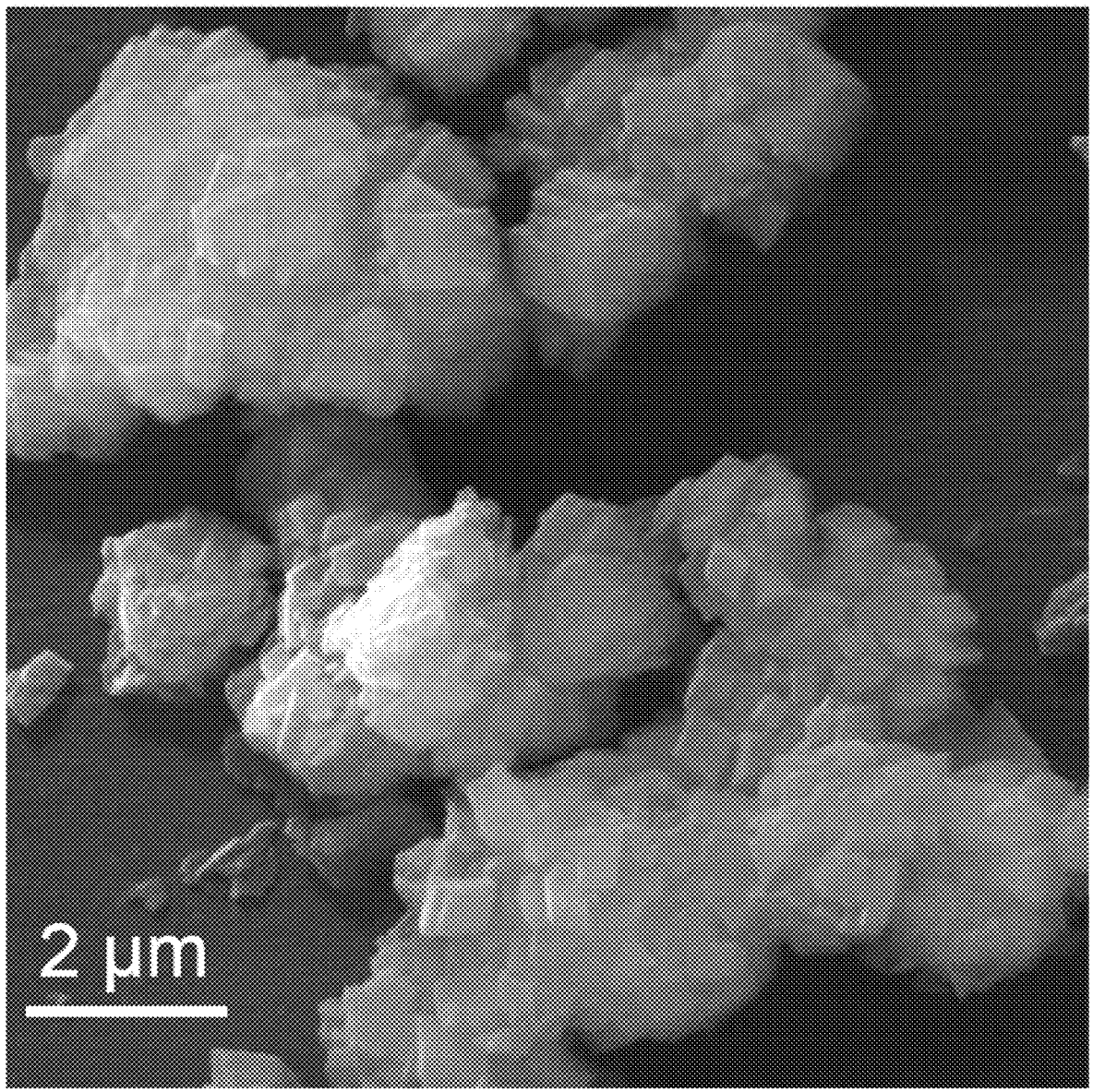
FIG. 3B shows a field emission scanning electron microscopy (FE-SEM) image of 5 mol % $Ca^{2+}$-doped $MgCO_3$.
Figure 3C:
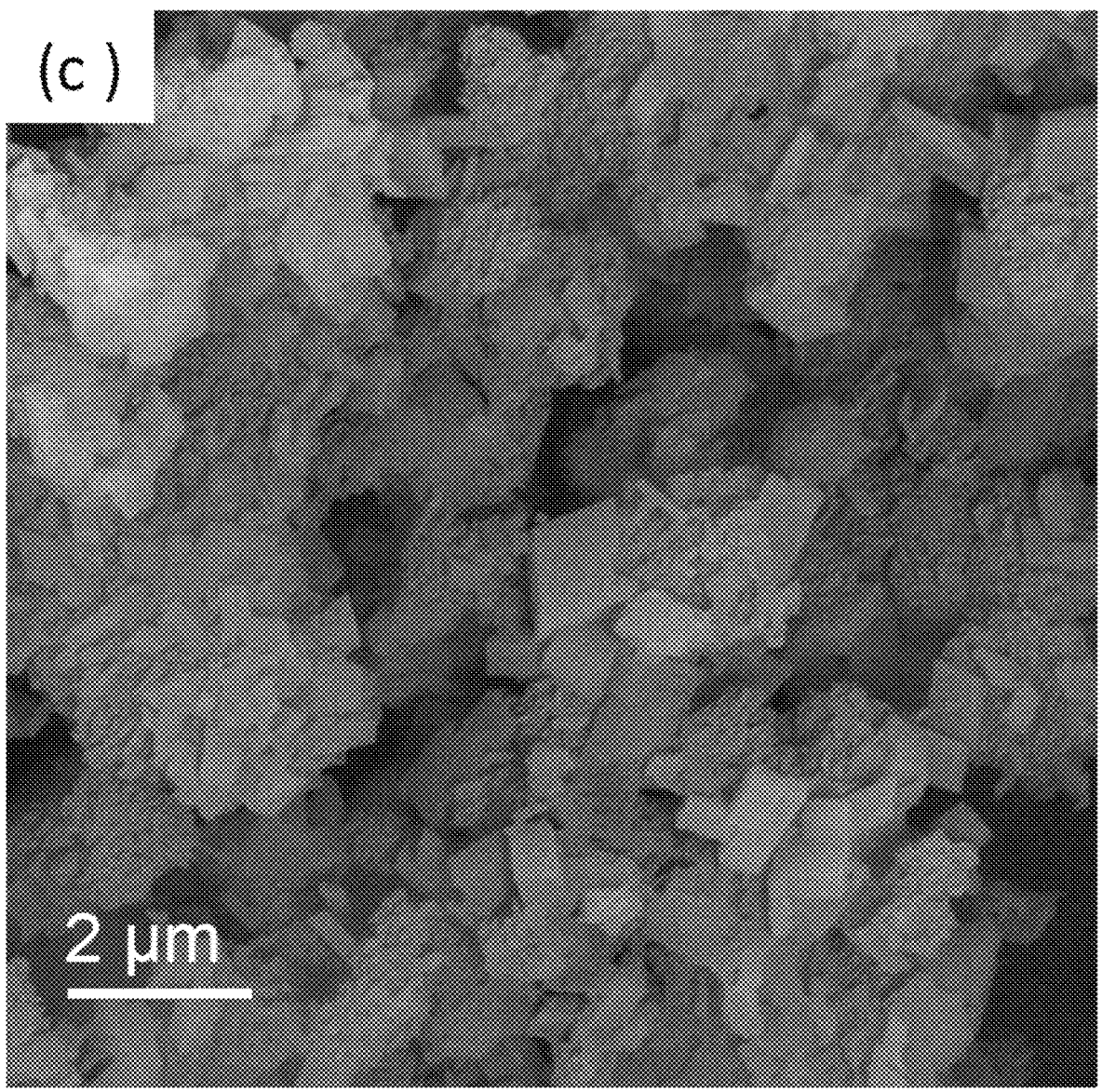
FIG. 3C shows a field emission scanning electron microscopy (FE-SEM) image of 10 mol % $Ca^{2+}$-doped $MgCO_3$.
Figure 3D:
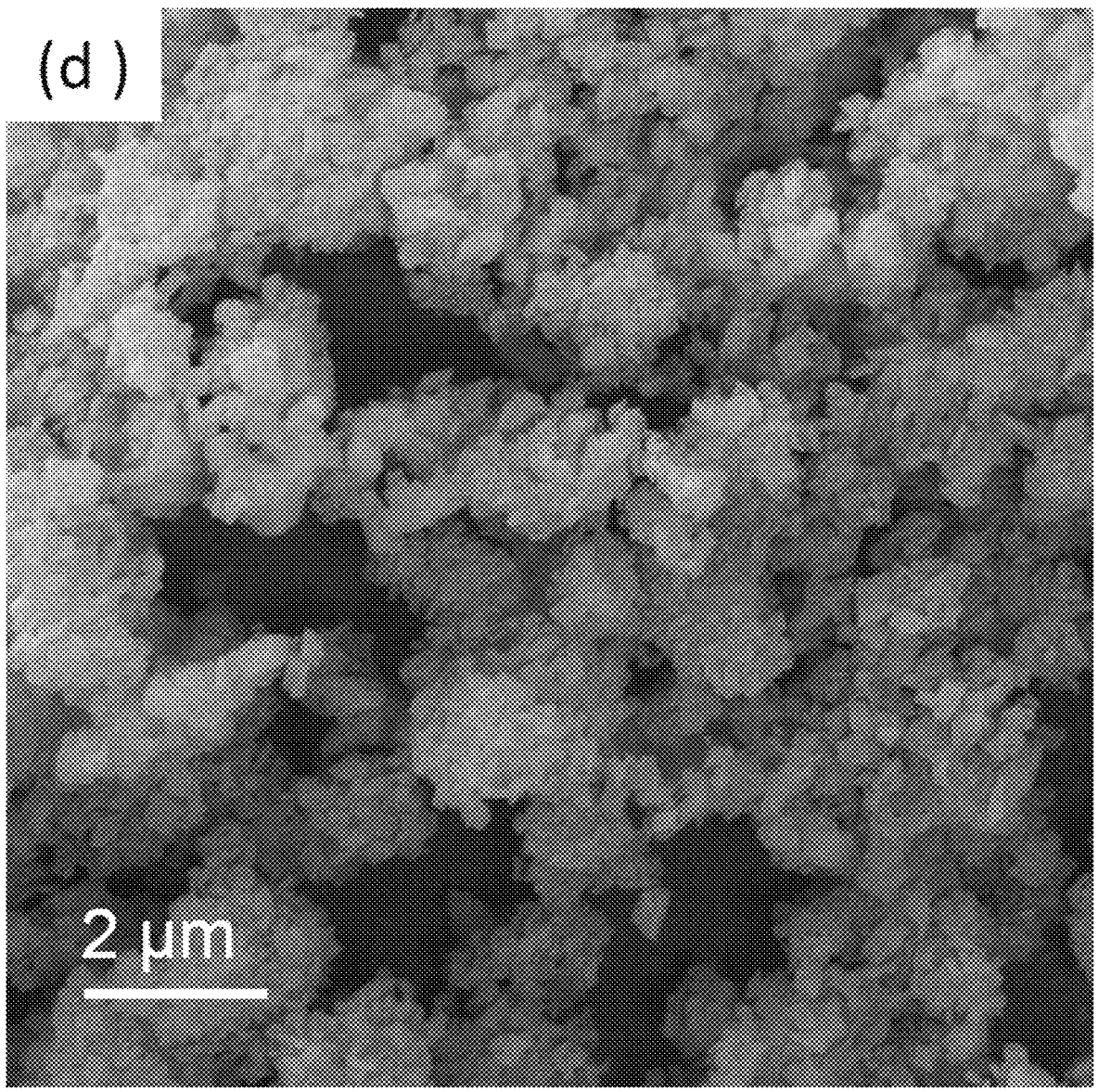
FIG. 3D shows a field emission scanning electron microscopy (FE-SEM) image of 15 mol % $Ca^{2+}$-doped $MgCO_3$.
Figure 5:
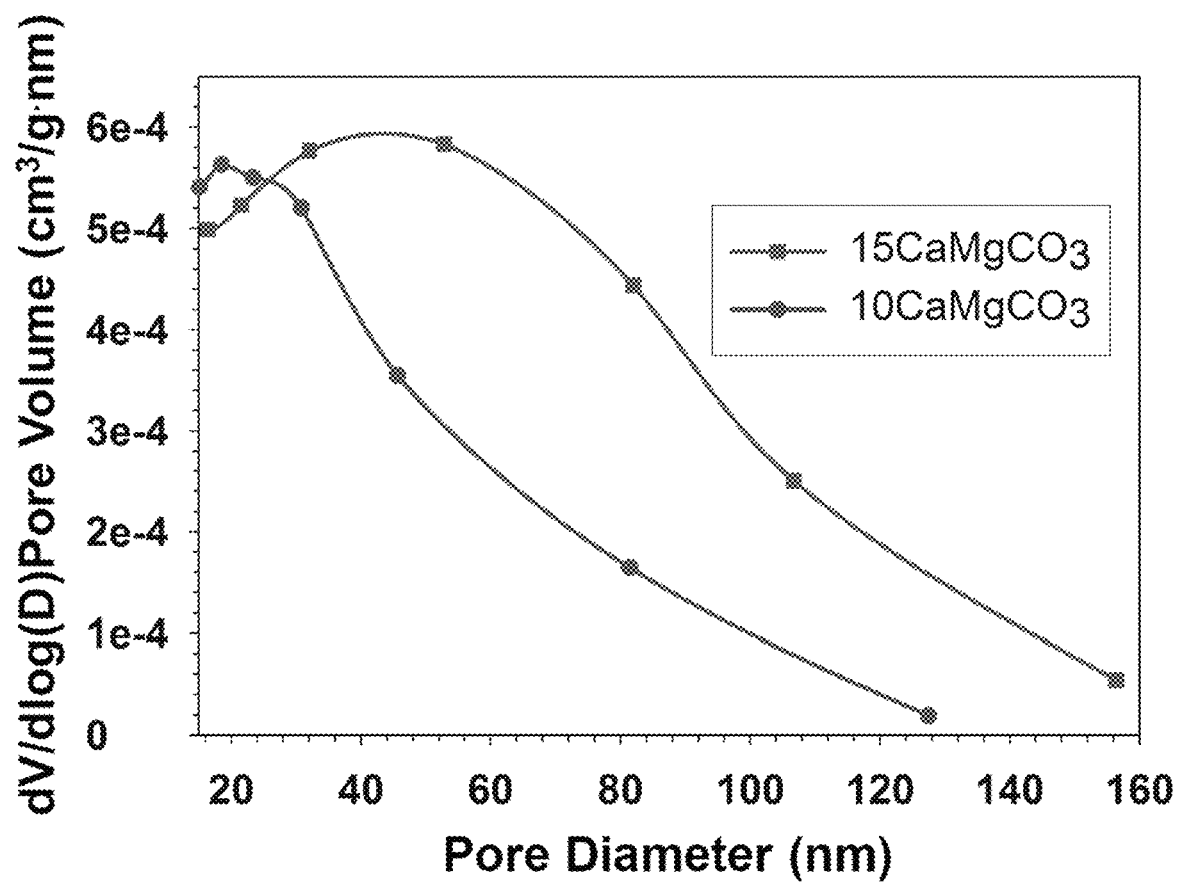
FIG. 5 shows pore size distributions of 10 mol % $Ca^{2+}$-doped $MgCO_3$ and 15 mol % $Ca^{2+}$-doped $MgCO_3$ samples.

FIG. 3A shows FE-SEM images of MgCO$_3$ prepared as described herein, PEG-impregnated MgCO$_3$, FIG. 3B 5 mol % $Ca^{2+}$-doped $MgCO_3$, FIG. 3C 10 mol % $Ca^{2+}$-doped $MgCO_3$, and FIG. 3D 15 mol % $Ca^{2+}$-doped $MgCO_3$. FIG. 3A indicates that the $MgCO_3$ product was composed of rhomboidal particles with an average length of 15 μm and thickness of 5 μm. The surface morphology of the single-crystal $MgCO_3$ was smooth and did not change after calcination at 400° C. for up to 2 hours. Average rhomboidal $MgCO_3$ crystal length may be in a range of from 1 to 20, 2.5 to 19, 5 to 18, 7.5 to 17.5, 10 to 17, 12.5 to 16.5, or 14 to 16 μm and/or an average rhomboidal $MgCO_3$ crystal thickness may be in a range of from 0.5 to 10, 0.75 to 9, 1 to 8, 2.5 to 7.5, or 4 to 6 μm. Ratios of rhomboidal dimensional length: height of $MgCO_3$ crystals within the scope of the invention may be in a range of from 1:10 to 10:1, 1:8 to 8:1, 1:6 to 6:1, 1:4 to 4:1, 1:2 to 2:1, and even 1:1. Together with the L:H ratio, or separately, ratios of rhomboidal dimensional length and/or height: thickness of $MgCO_3$ crystals within the scope of the invention may be in a range of from 1:2 to 20:1, 1:1 to 10:1, 1:1 to 8:1, 1:1 to 7:1, 2:1 to 6:1, or 2:1 to 5:1, with the upper and lower ratio end points being applicable to any combination. The rhomboidal shapes may be triangular, square or rectangular, hexagonal, and/or trapezoidal prismatic or diamond prismatic, i.e., having acute angles in a range of from 85 to 15, 75 to 25, 60 to 30, or 50 to 40° and corresponding obtuse angles. Moreover, the crystal shape(s) may independently include 0, 1, 2, 3, 4, 5, 6, 7, or 8 right angle corners. Crystals may have pyramidal shapes 3, 4, or 5-faces or more. Up to 25, 20, 15, 10, 7.5, 5, or 2.5% of the $MgCO_3$ crystals may take on an at least partially monoclinic, triclinic, cubic, orthorombic, and/or hexagonal crystal structure, depending on doping. Increased doping may lead to dopant-type-dependant amorphism. The $MgCO_3$ crystals may be at least 50, 60, 70, 75, 85, 90, or 95% rhomboidal, with remainders being largely amorphous and/or spheroidal. The porosity of the inorganic material, particularly the $MgCO_3$ crystals or the $Ca^{2+}$-doped $MgCO_3$ crystals, may be in a range of 1 to 33, 2 to 25, 5 to 20%.

The method described herein predominantly yielded uniform rhombohedral particles, i.e., in an amount of at least 75%, or at least 80, 85, 90, 92.5, 95, 97.5, 98, 99, 99.5, or even 99.9%. However, large or small microparticles can also be produced by the hydrothermal method described herein in an amount of, e.g., no more than 30, 20, 12.5, 10, 8, 6, 5, 4, 3, 2, or 1% based on the total amount of particles. The particle size ranged from the hundreds of nanometers scale to tens of micrometers, and the mean size in the longest dimension of these microparticles may be in a range of from 50 nm to 50 μm, 100 nm to 40 μm, 250 nm to 35 μm, 500 nm to 30 μm, 750 nm to 25 μm, 1 to 20 μm, 2.5 to 17.5 μm, 5 to 15 μm, 7.5 to 12.5 μm, or even 10 μm. The crystallinity of the microparticles larger than 100 nm improved significantly during the hydrothermal process. This produced clean, smooth, single-crystalline $MgCO_3$. However, rhomboidal building block particles disintegrated upon doping with $Ca^{2-}$ during the hydrothermal process. The $Ca^{2+}$ ions are believed to function as a hammer, forming very fine powders with a porous structure. FE-SEM images in FIG. 3(b) to (d) reveal that, after doping with at least 5 mol % $Ca^{2+}$, the $MgCO_3$ particles began to break apart. Doping with 15 mol % $Ca^{2+}$ converted all building blocks into a flake-like morphology.

Figure 4:
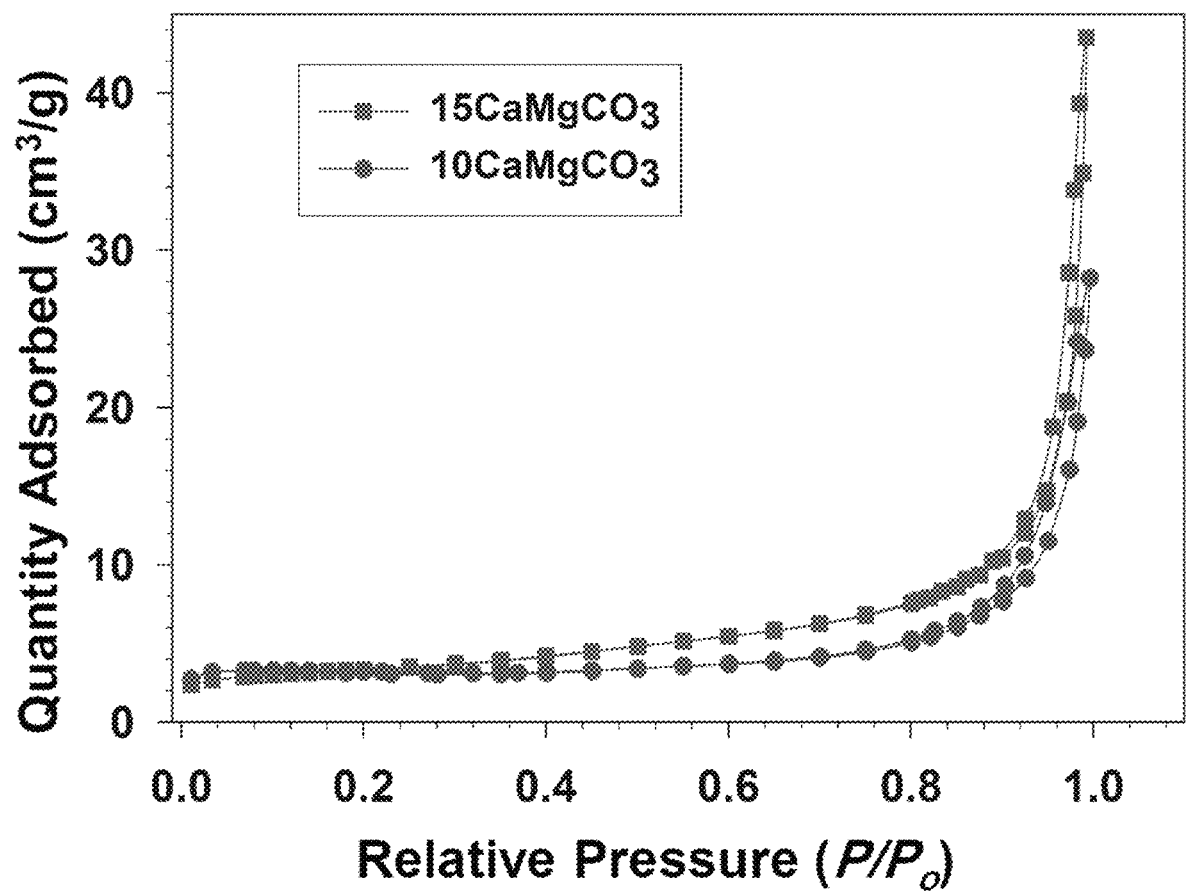
FIG. 4 shows $N_2$ adsorption-desorption isotherms of 10 mol % $Ca^{2+}$-doped $MgCO_3$ and 15 mol % $Ca^{2+}$-doped $MgCO_3$ samples.

FIG. 4 shows the pore size distributions of 10 mol % $Ca^{2+}$-doped $MgCO_3$ (with circular points) and 15 mol % $Ca^{2-}$-doped $MgCO_3$ (square points) samples characterized by $N_2$ adsorption and desorption isotherms. A marked leap at the high $P/P_0$ range (0.8 to 1.0) was observed in the isotherms of both the 10 mol % $Ca^{2+}$-doped $MgCO_3$ and 15 mol % $Ca^{2+}$-doped $MgCO_3$ samples, indicating a pore size distribution that ranged from large mesopores to macropores. A small average pore size tends to hinder PCM molecular motion, which decreases the latent heat storage capacity of the material. Conversely, large pores provide insufficient capillary forces to retain the liquid wax. A mesoporous support may thus perform best in certain applications. Therefore, the PEG-based composite PCMs stabilized by mesoporous matrices may provide high-performance heat storage systems.

FIG. 5 shows that a broaden pore size distribution was obtained over the range 15 to 150 nm, showing the presence of numerous large mesopores and/or macropores in the 15 mol % $Ca^{2+}$-doped $MgCO_3$ sample. Exemplary widths at half-heights of pore size distributions for 10 mol % $Ca^{2+}$-doped $MgCO_3$ may be in a range of from 0.01 to 60, 0.1 to 57.5, or 1 to 55 nm, while that of 15 mol % $Ca^{2+}$-doped $MgCO_3$ may be from 0.01 to 110, 0.1 to 100, 1 to 95, 5 to 90, or 10 to 85 nm. The 15 mol % $Ca^{2+}$-doped $MgCO_3$ sample displayed a large specific surface area of 15.47 $m^2/g$ compared to that of the bulk $MgCO_3$ 8.14 $m^2/g$. While the pore size is not limited beyond the particular application, inventive (5 to 20, esp. 15 mol %) $Ca^{2+}$-doped $MgCO_3$ may have specific surface area in a range of from 5 to 50 $m^2/g$, or at least 7.5, 10, 11, 12, 12.5, 13, 14, or 15 $m^2/g$ and/or up to 45, 40, 35, 30, 27.5, 25, 22.25, or 20 $m^2/g$. FIG. 5 shows numerous pores several tens of nanometers in diameter present on the 15 mol % $Ca^{2+}$-doped $MgCO_3$ sample surface, possibly as a result of $MgCO_3$ nanoparticle etching. The 15 mol % $Ca^{2+}$-doped $MgCO_3$ sample shows a Barrett-Joyner-Halenda (BJH) adsorption average pore diameter of 20 nm and a BJH adsorption cumulative pore volume of 0.16 $cm^3/g$. Porous 15 mol $Ca^{2+}$-doped $MgCO_3$ material thus may provide a good support matrix for shape-stabilized composite PCMs, and may have an average pore diameter in a range of from 1 to 40, 5 to 35, 10 to 30, 15 to 25, 17.5 to 22.5 nm and/or a BJH adsorption cumulative pore volume in a range of from 0.05 to 0.30, 0.075 to 0.275, 0.10 to 0.25, 0.125 to 0.225, 0.13 to 0.20, 0.14 to 0.18, or 0.15 to 0.175 $cm^3/g$.

Figure 6A:
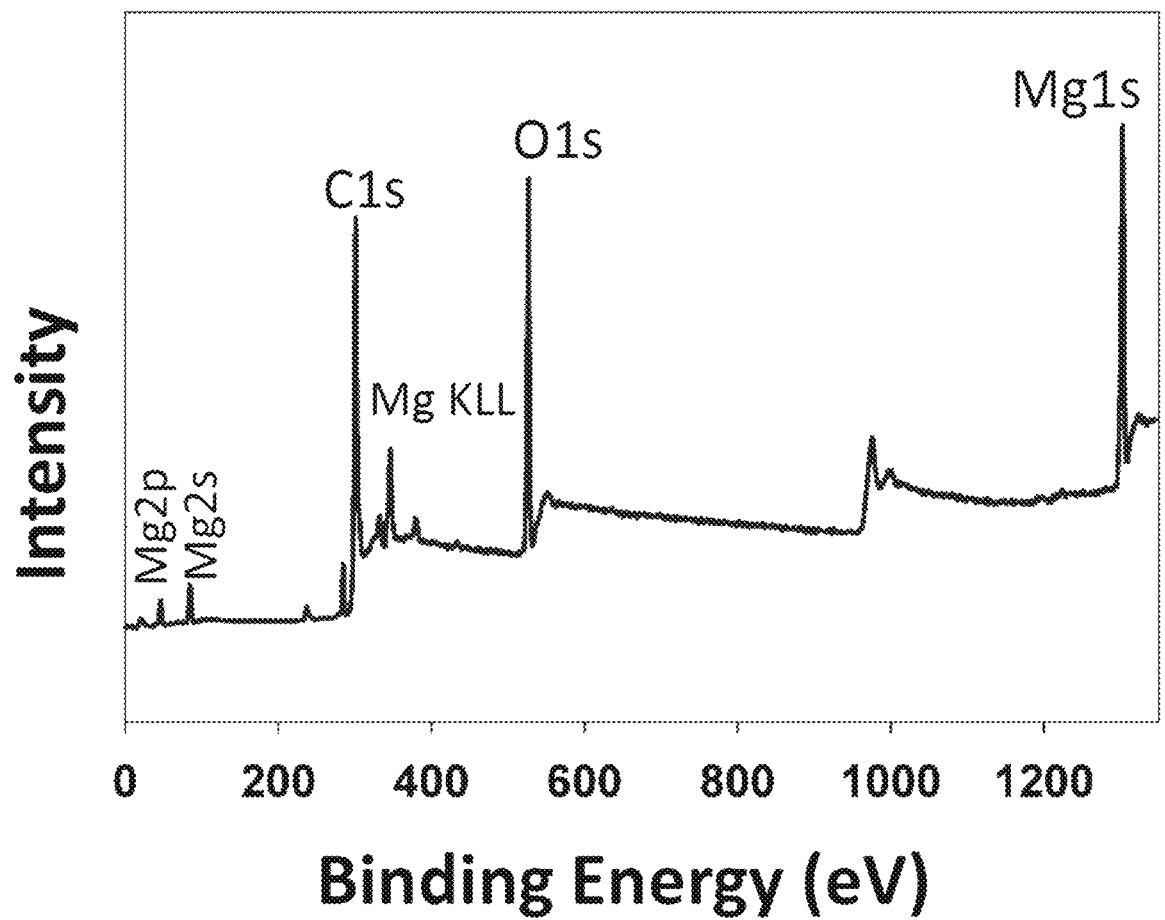
FIG. 6A shows x-ray photoelectron spectroscopy (XPS) spectra of survey spectrum 15 mol % $Ca^{2+}$-doped $MgCO_3$.
Figure 6B:
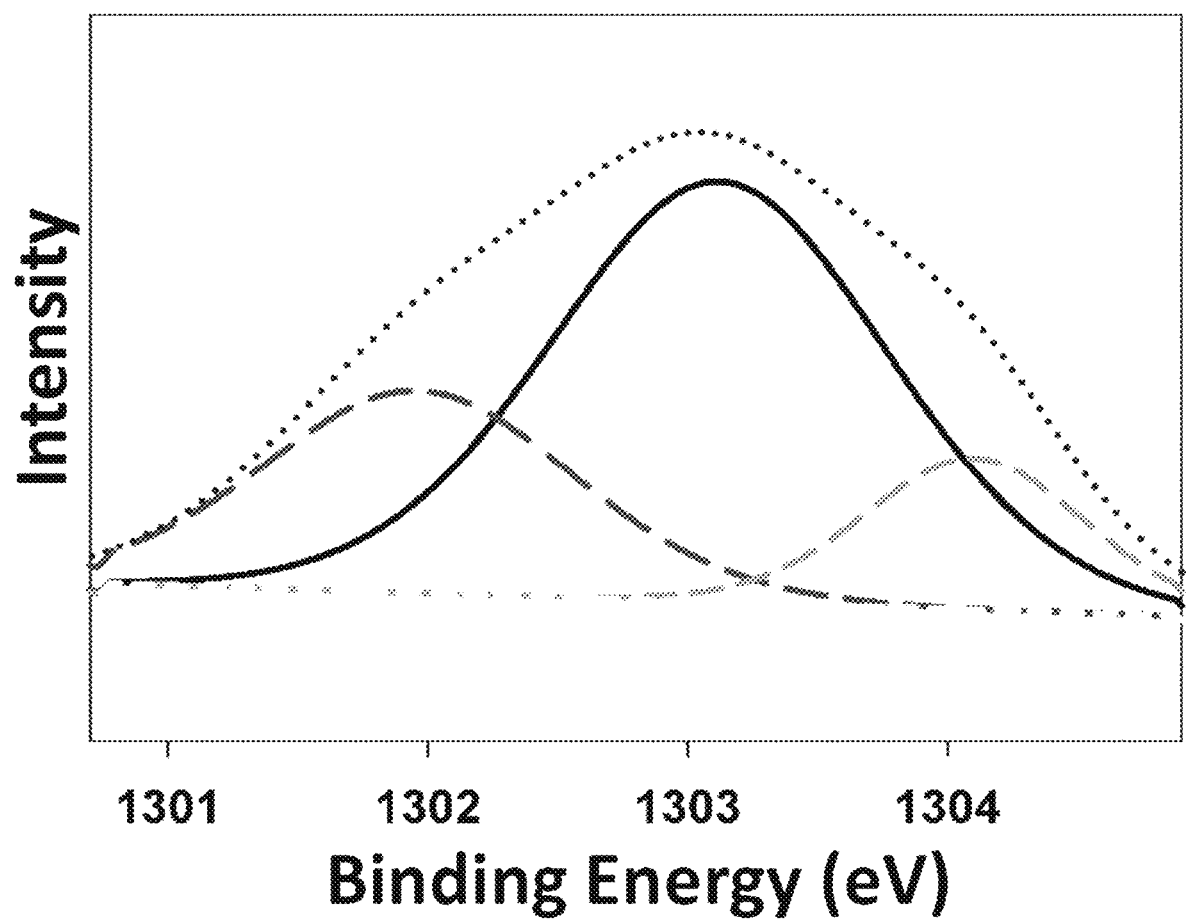
FIG. 6B shows x-ray photoelectron spectroscopy (XPS) spectra of magnesium is region.

FIG. 6A shows characteristic XPS peaks for the magnesium, calcium, oxygen and carbon elements on the surface of the 15 mol % $Ca^{2+}$-doped $MgCO_3$. FIG. 6B shows the Mg 1s core level spectrum was resolved into three components peaks. The high binding-energy component peak in FIG. 6B may be assigned to magnesium hydroxide, while the second intensity peak may be attributed to Mg, and the third to magnesium oxide (MgO).

Figure 6C:
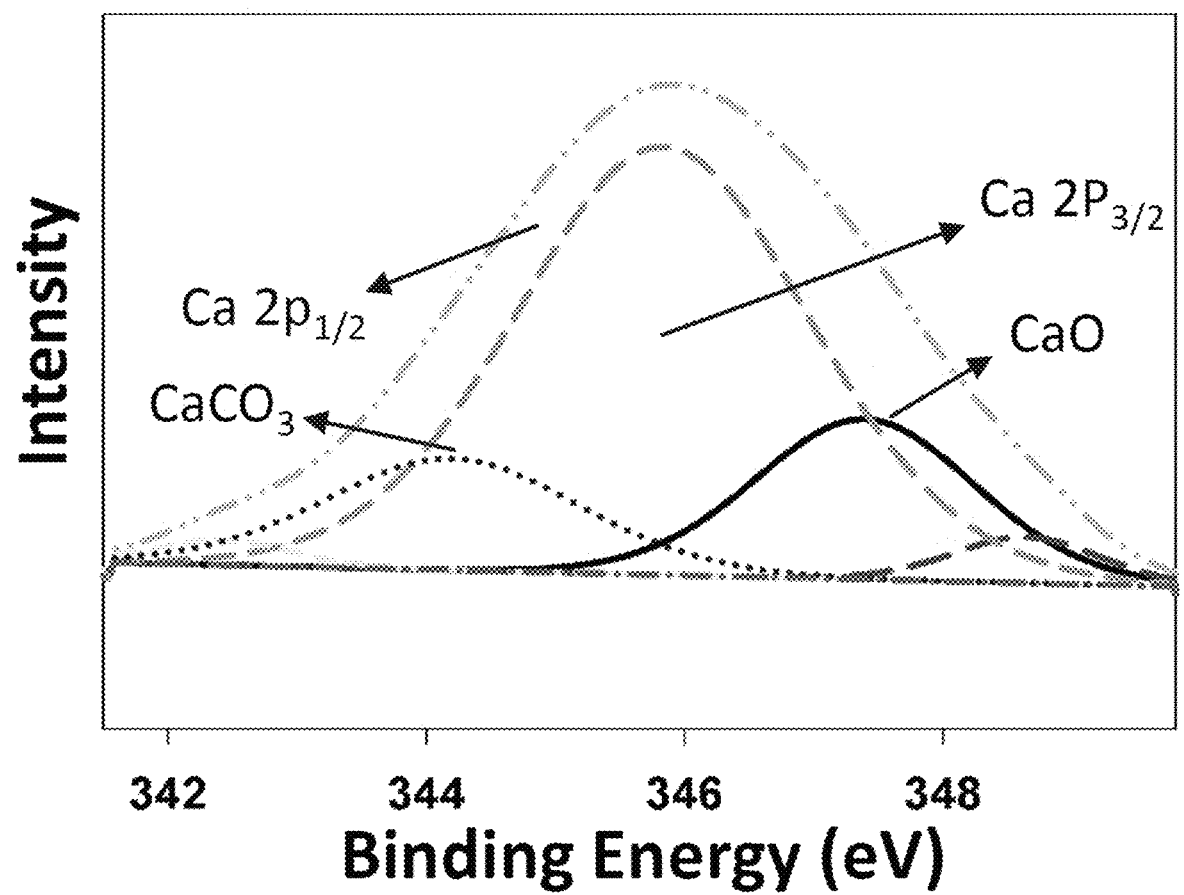
FIG. 6C shows x-ray photoelectron spectroscopy (XPS) spectra of calcium 3p region.

The calcium 2p core level XPS spectrum, shown in FIG. 6C, consists of two sublevels ($2p_{3/2}$ and $2p_{1/2}$) due to spin-orbit splitting. The binding energies in the calcium 2p region, may be determined by devolution of the spectrum using a non-linear least squares algorithm with a Shirley background and a Gaussian-Lorentzian mixed line shape. The resolution of the calcium 2p spectrum into its component peaks is shown in FIG. 6C.

Figure 6D:
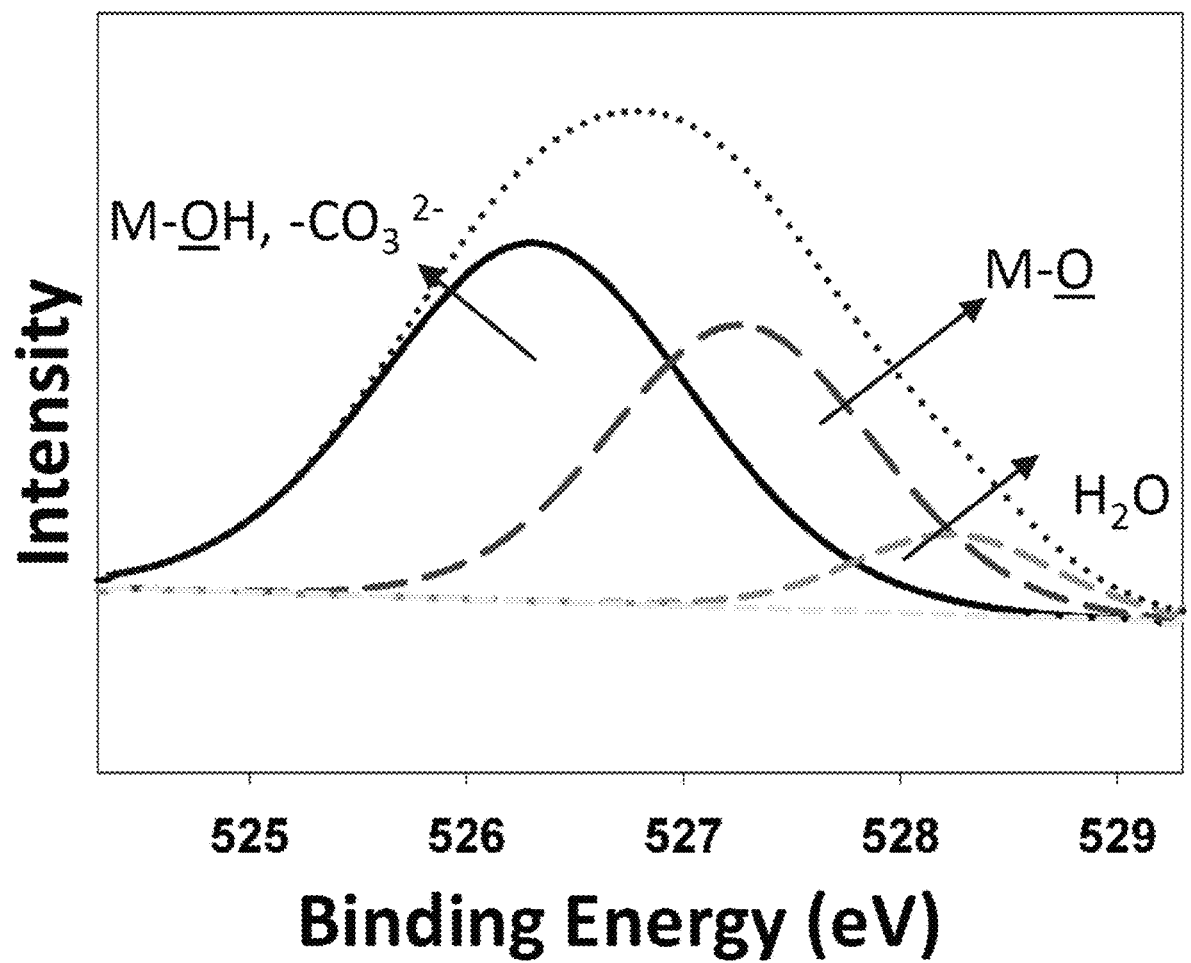
FIG. 6D shows x-ray photoelectron spectroscopy (XPS) spectra of oxygen is region.
Figure 6E:
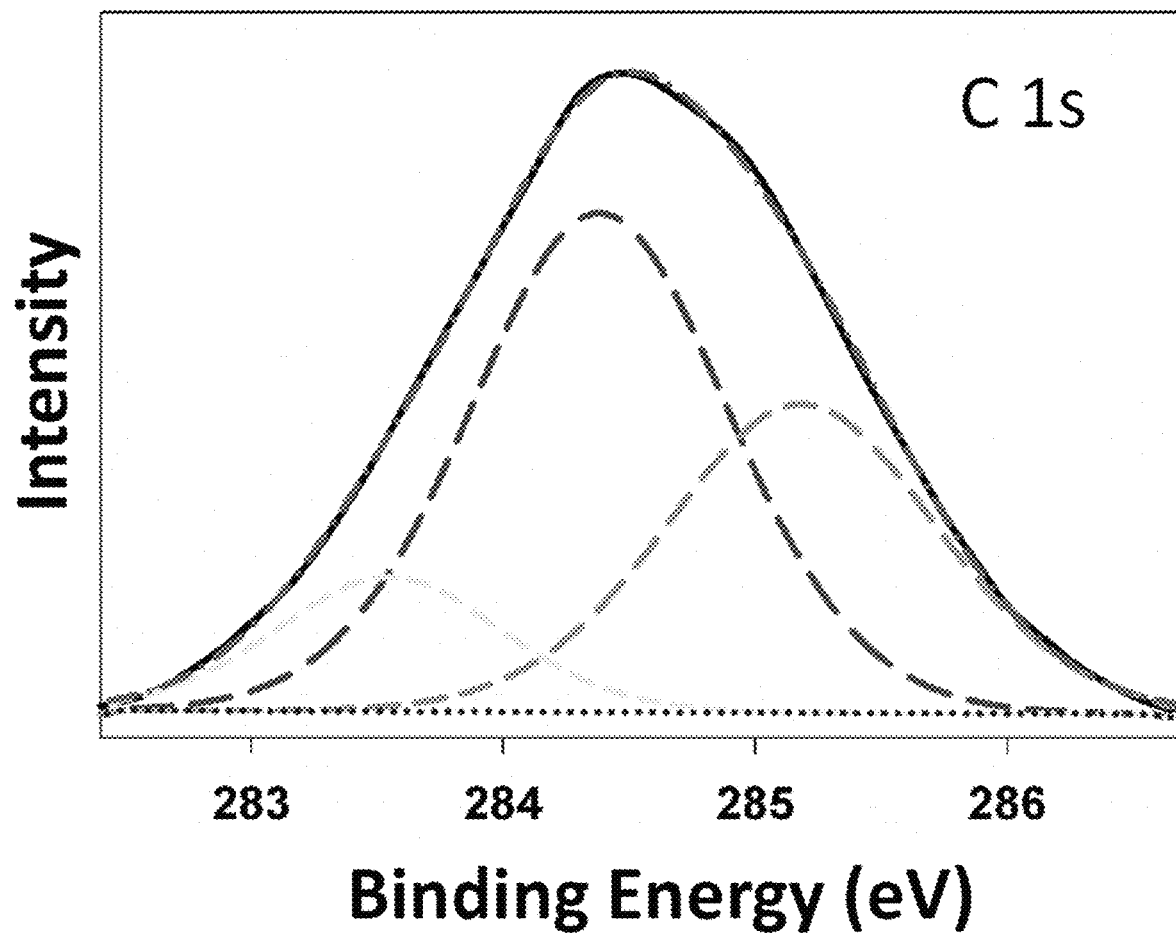
FIG. 6E shows x-ray photoelectron spectroscopy (XPS) spectra of carbon is region.

FIG. 6D shows a high-resolution scan of oxygen 1s XPS spectrum can be divided into three component peaks, attributed to the CaO and the hydroxyl group bonded with magnesium (MgO), as indicated on the plot. The oxygen 1s high binding-energy component may be assigned to adsorbed oxygen species (such as water and carbonates) to Mg and Ca that result from exposure of the sample to air as well as due to hydrothermal process. FIG. 6E shows a high-resolution scan of carbon 1s XPS spectrum.

Figure 7:
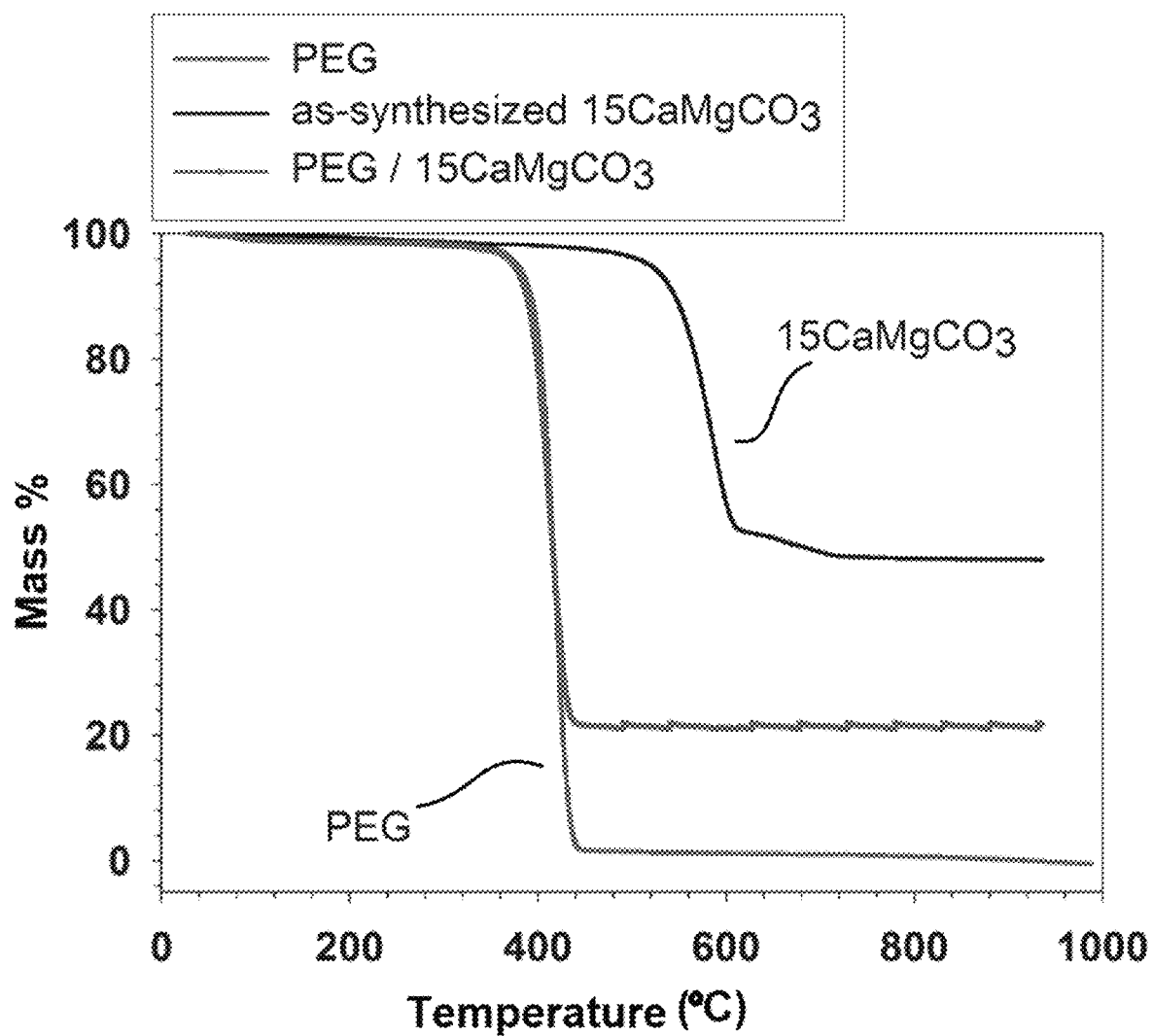
FIG. 7 shows thermogravimetric analysis (TGA) curves of PEG-6000, 15 mol % $Ca^{2+}$-doped $MgCO_3$, and PEG-6000/15 mol % $Ca^{2+}$-doped $MgCO_3$ samples.

FIG. 7 shows TGA curves of pure PEG (0 to 100 mass %), 15 mol % $Ca^{2+}$-doped $MgCO_3$ (upper, less weight loss), and the composite of PEG-6000/15 mol % $Ca^{2+}$-doped $MgCO_3$ (middle). The TGA decomposition process was carried out at a heating rate of 5° C./min under an argon atmosphere. TGA analysis showed that the 15 mol % $Ca^{2+}$-doped $MgCO_3$ powders decomposed into $CO_2$ and MgO at 530° C. A weight loss of 34.5% was determined for the porous 15 mol % $Ca^{2+}$-doped $MgCO_3$ with heating up to 500° C. due to the removal of the absorbed water and hydroxyl groups. Pure PEG-6000 began to melt at about 440° C., and the total weight loss percentage was 100% at 500° C. The weight loss of the composite PCM may have resulted from the removal of PEG molecules from the composite, in addition to the removal of the absorbed water and hydroxyl groups from the matrix. The removal temperature and/or melting temperature of PEG from the composite was 20% higher than the corresponding values of pure PEG, showing the presence of good interactions between PEG and the 15 mol % $Ca^{2+}$-doped $MgCO_3$ matrix. These results show that the porous 15 mol % $Ca^{2+}$-doped $MgCO_3$ support improves the thermal stability of PEG by creating a defensive barrier. The total weight loss percentage of PEG-6000/15 mol % $Ca^{2-}$-doped $MgCO_3$ composites was 78.2% upon heating up to 500° C., but may be, for example no more than 50, 60, 70, 75, 77.5, 80, 85, or 90%. The impregnation ratio of PEG (M) in the composite could be calculated from the residual weight percent of the composite (W) and the pure $15CaMgCO_3$ (n) using Equation 5.

$$(1-M) \times n = W \quad \text{(Eq. 5)}$$

In the example shown in FIG. 7, the PEG impregnation ratio of the composite can be calculated as 73.0%, though the impregnation ratio may be tailored as desired, and may be in a range of from 60 to 85, 65 to 80, or 70 to 75%.

Figure 8A:
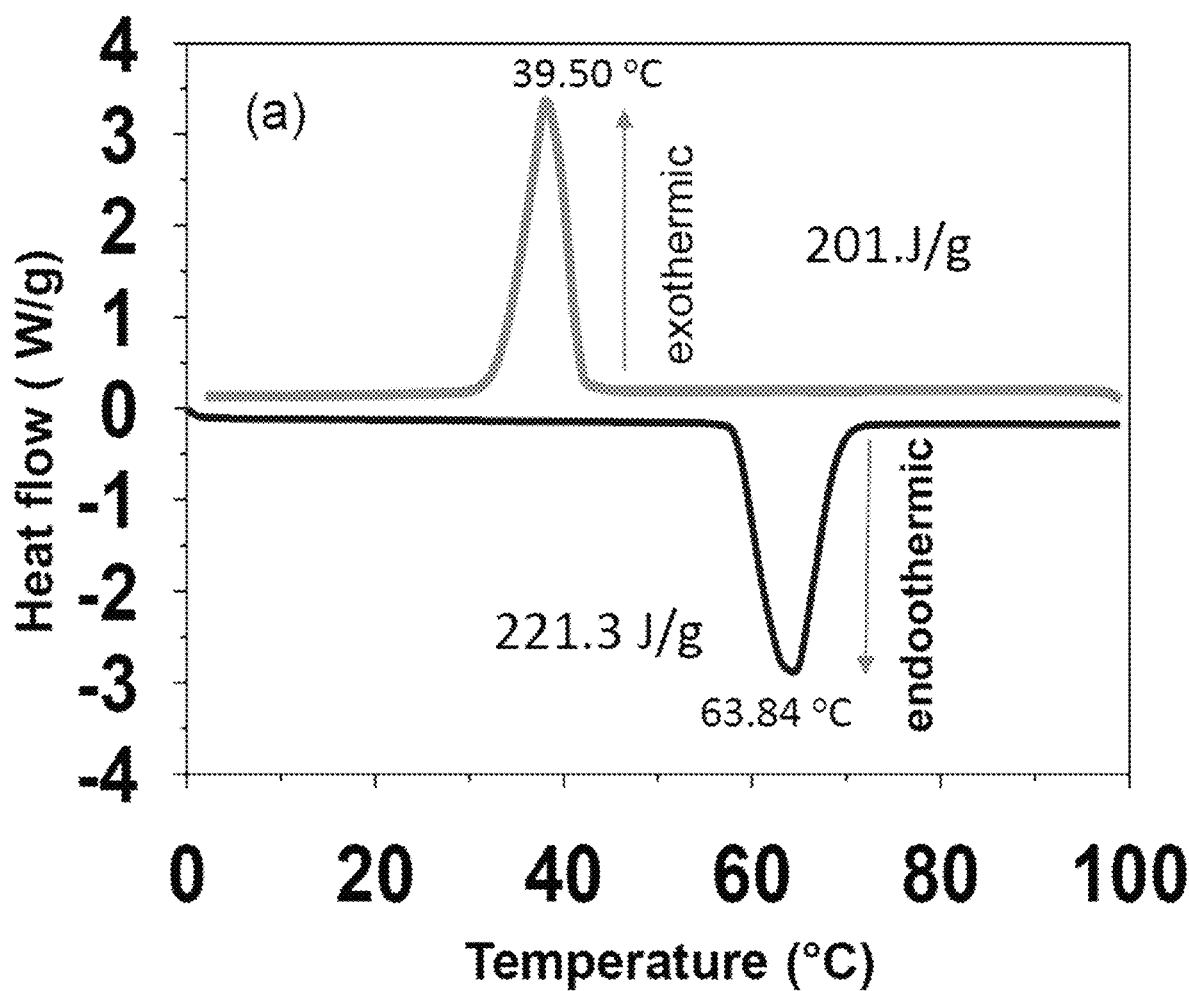
FIG. 8A shows melting-freezing DSC curves of PEG-6000.
Figure 8B:
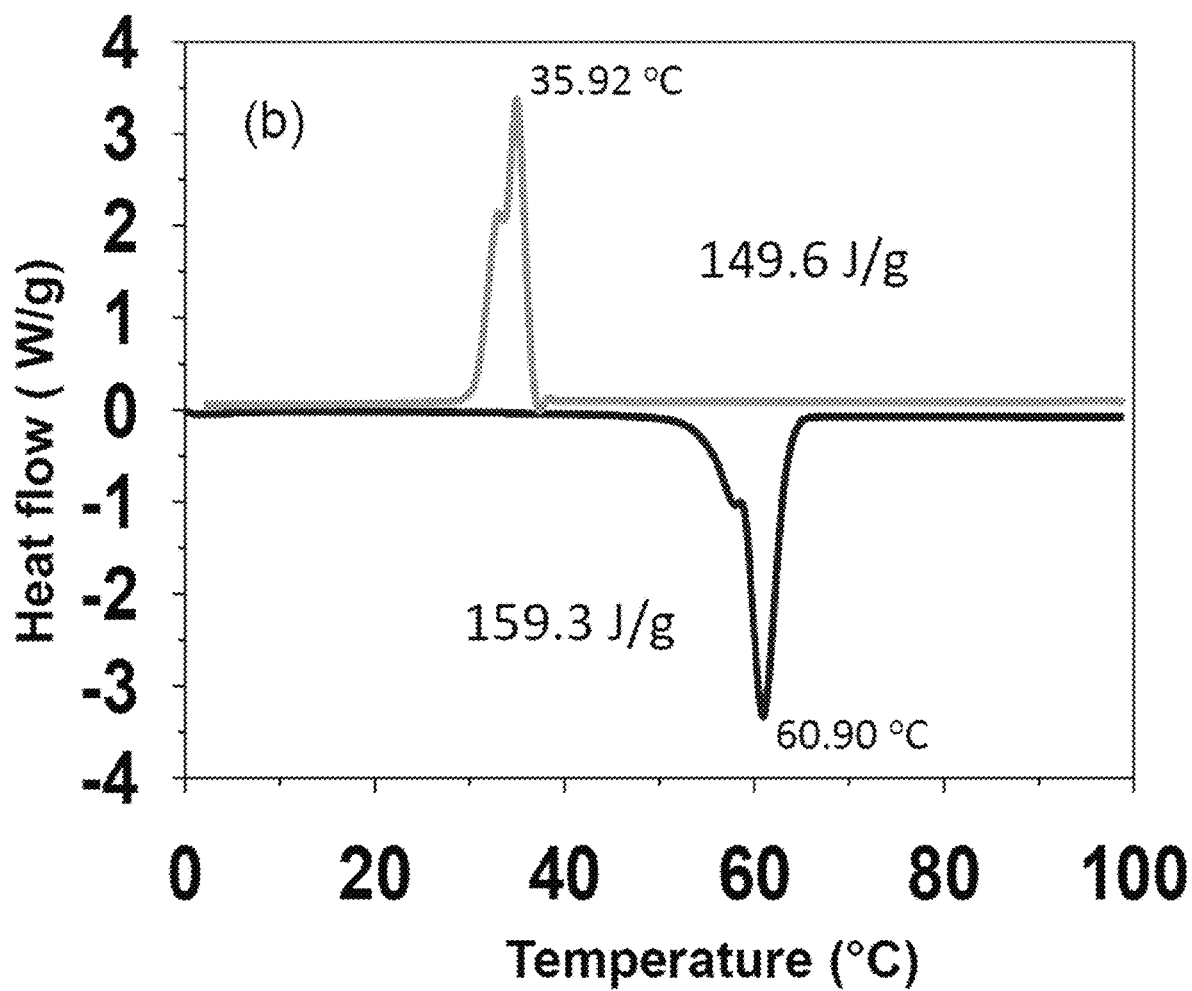
FIG. 8B shows melting-freezing DSC curves of PEG-6000/10 mol % $Ca^{2+}$-doped $MgCO_3$PCMs.

FIG. 8A illustrates the melting-freezing DSC curves obtained from pure PEG and FIG. 8B shows that of PEG-6000/10 mol % $Ca^{2+}$-doped $MgCO_3$ composite. The PEG DSC curve indicates a melting point ($T_m$) of 63.84° C. and a freezing point ($T_f$) of 39.50° C., as seen in FIG. 8A. The phase change characteristics of the composite were similar to those of pure PEG. The phase change enthalpies of the samples tested were calculated based on the enclosed area under the DSC curve during the melting process. The melting enthalpy of the pure PEG was 221.3 J/g, and the PEG-6000/10 mol % $Ca^{2+}$-doped $MgCO_3$ composite had a melting enthalpy ($\eta_{apparent}$, including the mass of 10 mol % $Ca^{2+}$-doped $MgCO_3$) of 159.3 J/g, a value lower than that of pure PEG, probably due to a weight fraction of the porous 10 mol % $Ca^{2+}$-doped $MgCO_3$ matrix in the composite, as seen in FIG. 8B. These DSC results make sense based on the heterogeneous morphology of the powdered 10 mol % $Ca^{2+}$-doped $MgCO_3$, and the imperfect PEG penetration and/or mixing. As a result, the melting and solidification peaks in the DSCs had shoulders around the narrow peaks.

Figure 9A:
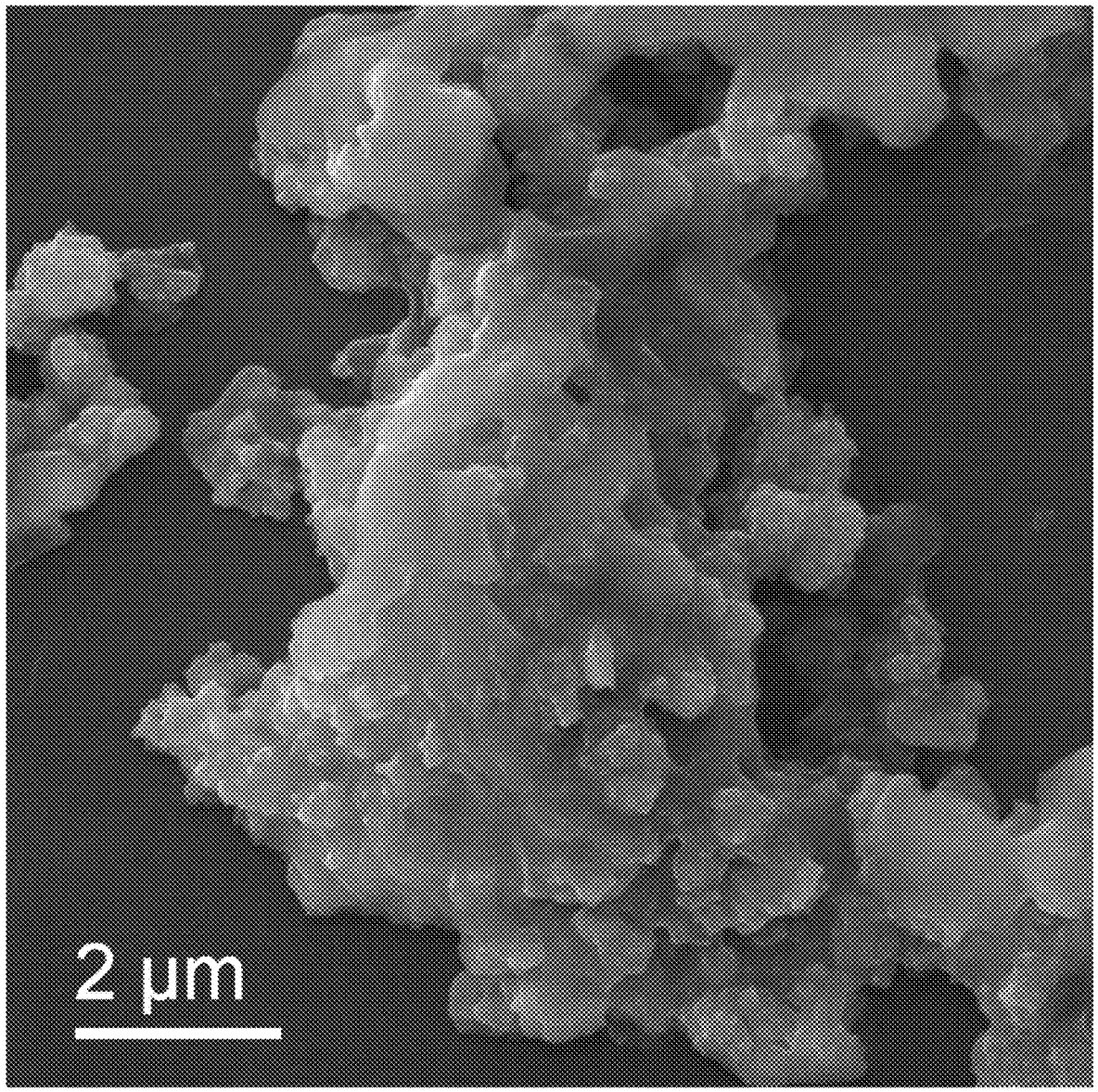
FIG. 9A shows an FE-SEM image of a 15 mol % $Ca^{2+}$-doped $MgCO_3$PCM sample.
Figure 9B:
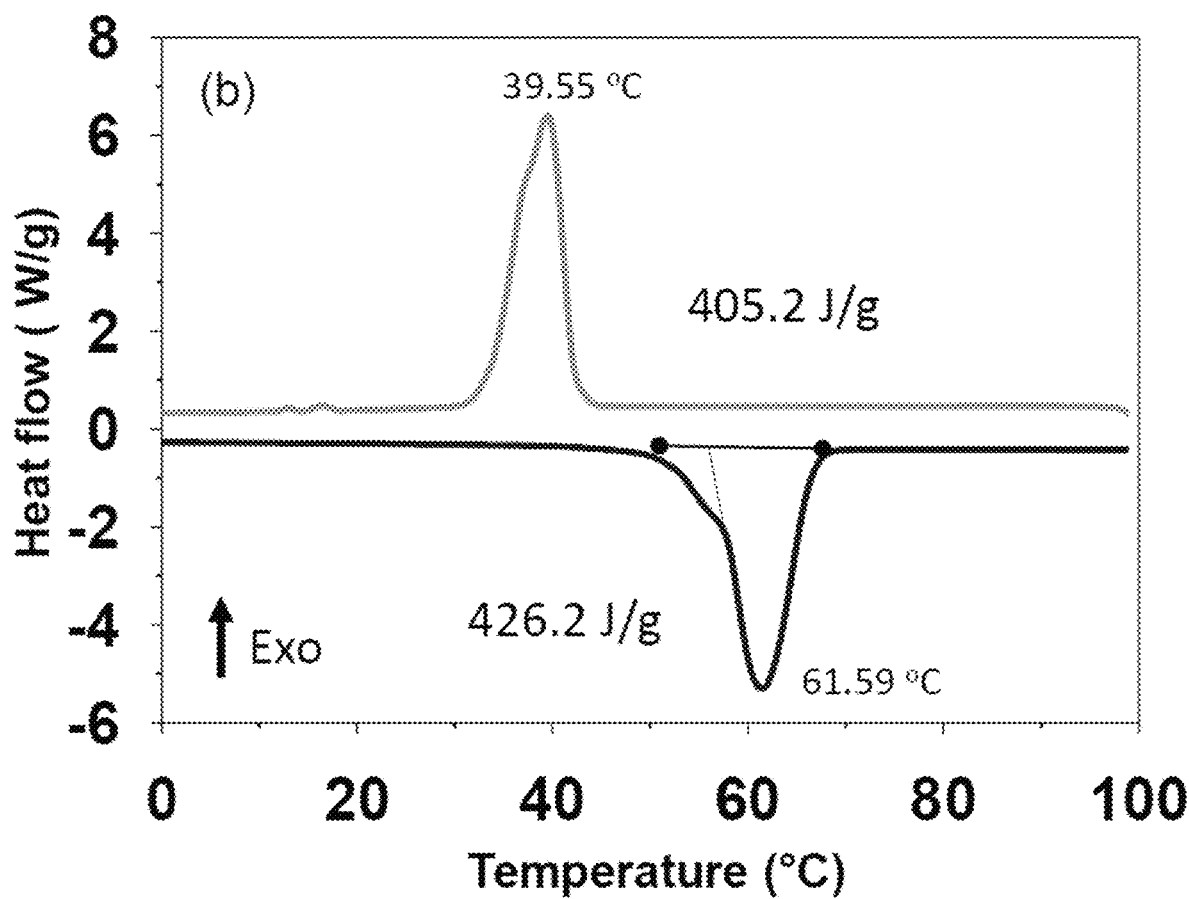
FIG. 9B shows melting-freezing DSC curves the 15 mol % $Ca^{2+}$-doped $MgCO_3$PCM sample from FIG. 9A.

The microstructure of the PEG-6000/15 mol % $Ca^{2+}$-doped $MgCO_3$ composite is shown in FIG. 9A by FE-SEM The porous texture of the 15 mol % $Ca^{2+}$-doped $MgCO_3$ composite matrix is not clearly visible in FIG. 9A, and the top surface appears compact and flat because the pores of the spongy and/or flake-like particles are filled with PEG. This indicates that the porous structure of the 15 mol % $Ca^{2+}$-doped $MgCO_3$ matrix is occupied and/or filled with a large quantity of PEG, most likely forming an efficient shape-stabilized PCM. As seen in FIG. 9B, the PEG-6000/15 mol % $Ca^{2+}$-doped $MgCO_3$ composite sample displayed an apparent melting enthalpy ($\eta_{apparent}$, including the mass of 15 mol % $Ca^{2+}$-doped $MgCO_3$) of 426.2 J/g, higher than the value obtained from pure PEG, probably due to the lack of weight fraction in the porous $CaMgCO_3$ matrix in the composite.

Figure 10A:
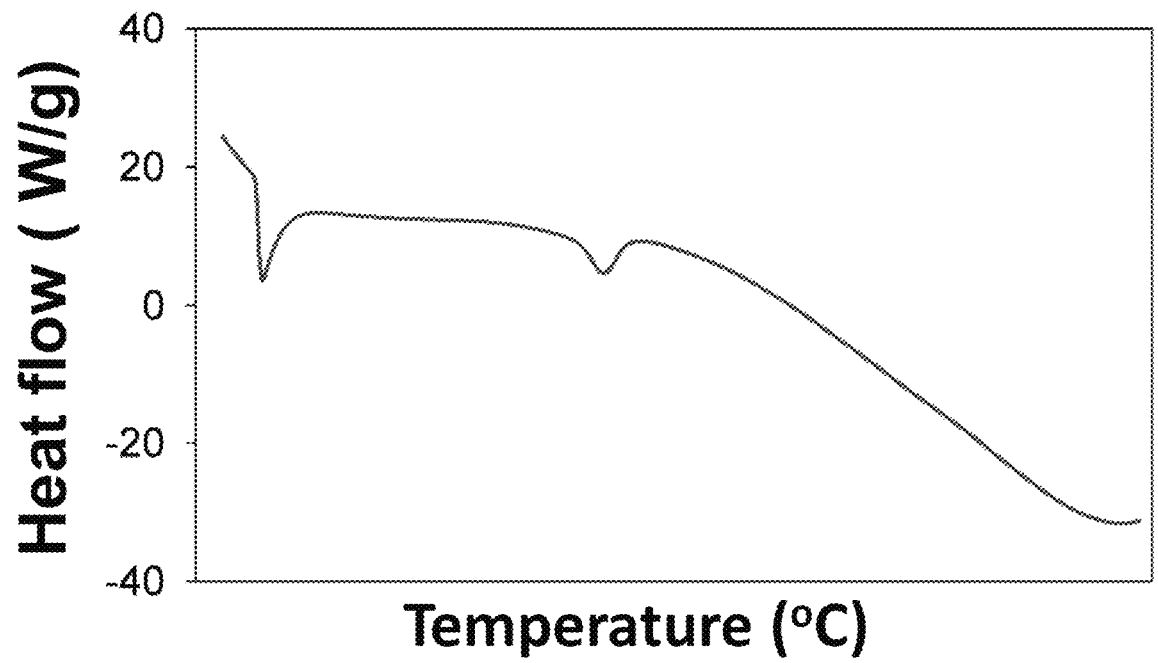
FIG. 10A shows DSC heating curve of 15 mol % $Ca^{2+}$-doped $MgCO_3$
Figure 10B:
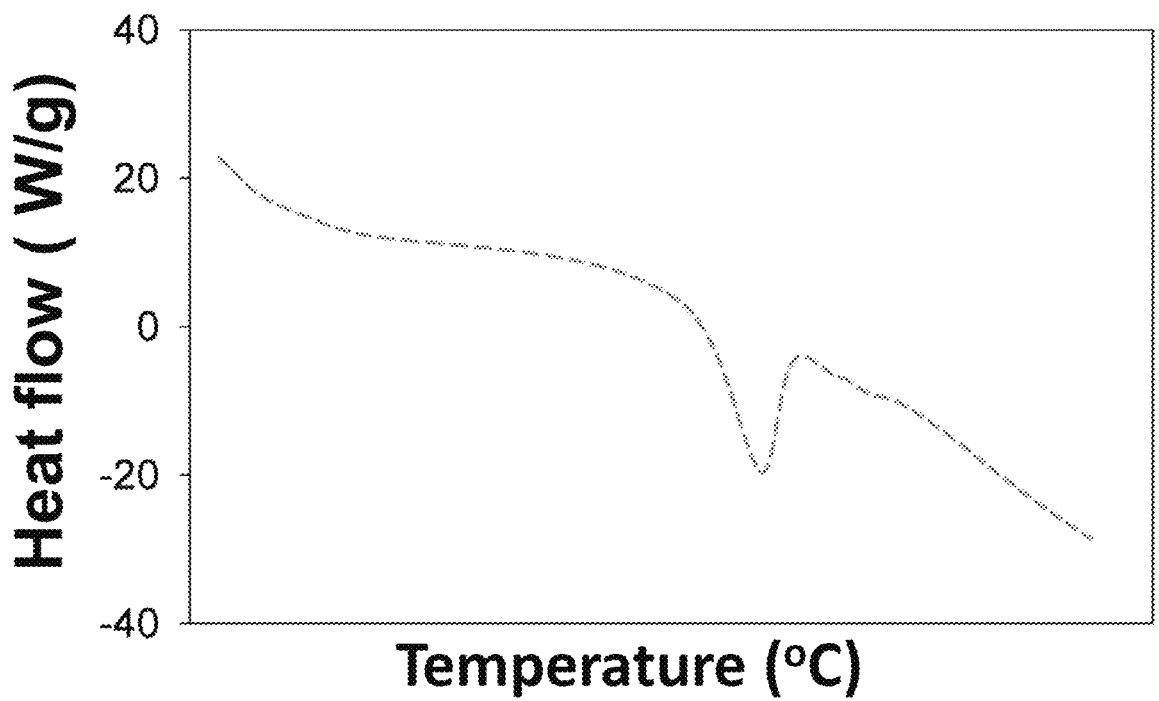
FIG. 10B shows DSC heating curve of PEG-6000.
Figure 10C:
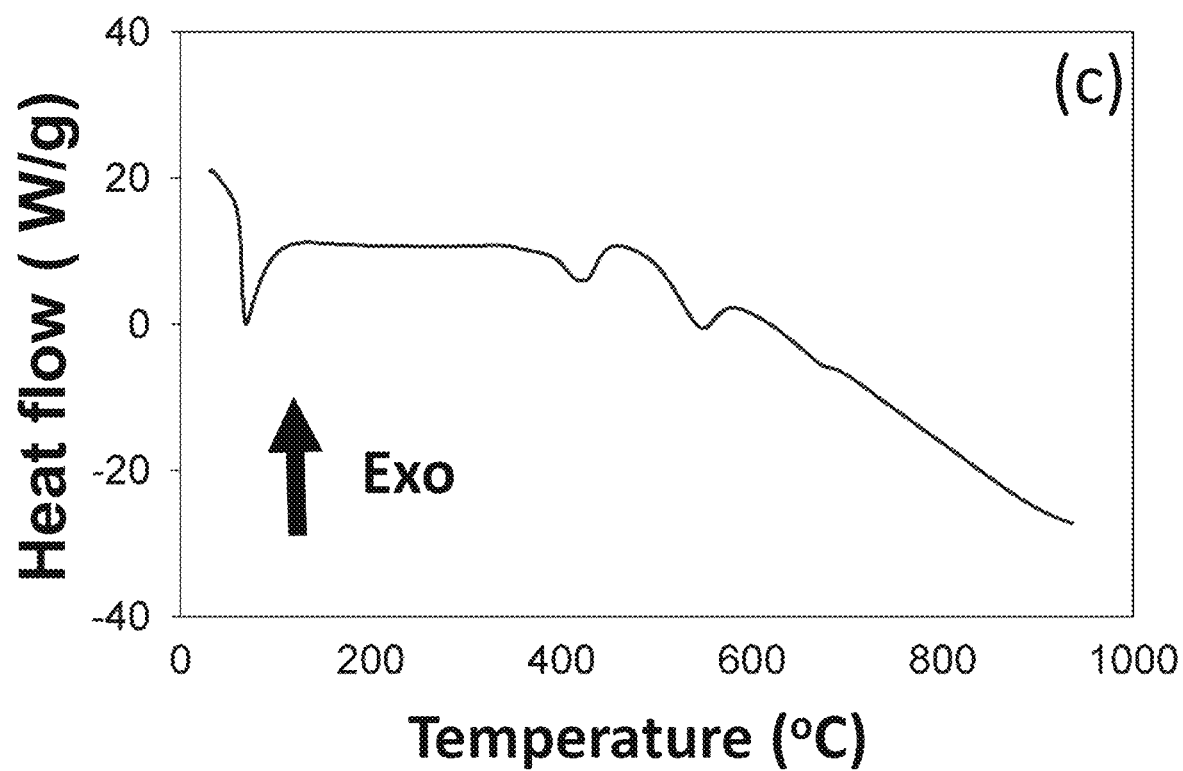
FIG. 10C shows DSC heating curve of a PEG-6000/15 mol % $Ca^{2+}$-doped $MgCO_3$.

FIG. 10A to 10C show DSC heating curves of 10A 15 mol % $Ca^{2+}$-doped $MgCO_3$, 10B PEG-6000 alone, and 10C composite PEG-6000/15 mol % $Ca^{2+}$-doped $MgCO_3$. Unlike conventional inorganic PCMs, with high thermal conductivity and energy storage densities over 530 J/g ($Li_2CO_3$ and $Na_2CO_3$ composite PCMs), or 357 J/g ($LiNO_3$), or 222 J/g ($NaNO_3$), the apparent chemical bonding between bridging oxygen atoms of $Mg^{2+}$ and $CO_3$ and hydroxyl group(s) of PEG in organic-inorganic composites within the scope of the invention may exhibit synergistic activity between organic and inorganic materials and consequently a high latent heat. As seen in FIG. 10A pure PEG-6000 exhibits two endothermic peaks, at around 65° C. and 430° C. respectively. As seen in FIG. 10B the 15 mol % $Ca^{2+}$-doped $MgCO_3$ sample alone exhibits an intense endothermic peak 580° C. As seen in FIG. 10C, the composite PEG-6000/15 mol % $Ca^{2+}$-doped $MgCO_3$ has endothermic peaks at 62° C., 450° C., and 550° C., which means that the 15 mol % $Ca^{2-}$-doped $MgCO_3$ is significantly involved in the phase change enthalpy. Higher phase change enthalpies of certain inventive encapsulated composites may correlate to higher filling rates of PEG in the microcapsules. Known AlOOH composites exhibit no such endothermic peak in the same temperature range of the DSC scan. Therefore, surprisingly, $CaMgCO_3$ composites can contribute to phase change enthalpy, not found in at least certain forms of AlOOH composites. The low phase change enthalpy of known microcapsules using AlOOH may be due to low filling rates of palmitic acid in the microcapsules.

Composite PCMs according to the invention can have unexpectedly high melting enthalpies. Such high latent heats have not previously been reported in the literature, and composite PCMs generally had lower latent heats than pure PCMs unless the supporting material provides a synergetic latent heat effect. Equation 6 can quantify the total weight-related energy storage capacity of the composites herein, including PEG-6000/15 mol % $Ca^{2+}$-doped $MgCO_3$, which gives an the apparent thermal storage efficiency ($\eta_{apparent}$) of 183% for the 15 mol % $Ca^{2+}$-doped $MgCO_3$ sample. Apparent thermal storage efficiencies of composites within the scope of the invention may be in the range of from 125 to 250, 140 to 225, 150 to 210, 160 to 200, or 175 to 190%.

$$\eta_{apparent} = (\Delta H_{apparent} / \Delta H_{apparent}) \times 100\% \quad \text{(Eq. 6)}$$

Figure 11A:
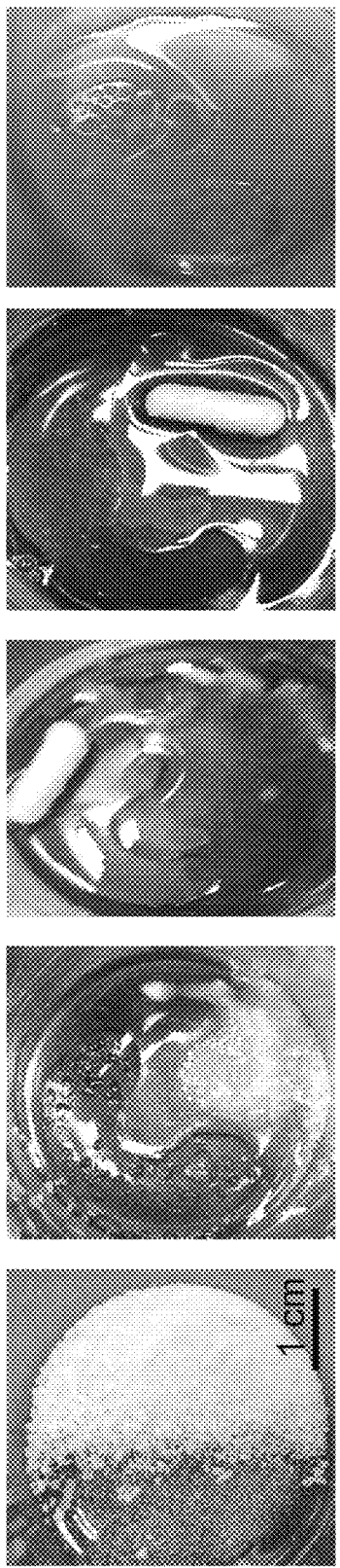
FIG. 11A shows photographs of pure PEG-6000 heated at 80° C. for different lengths of time.
Figure 11B:
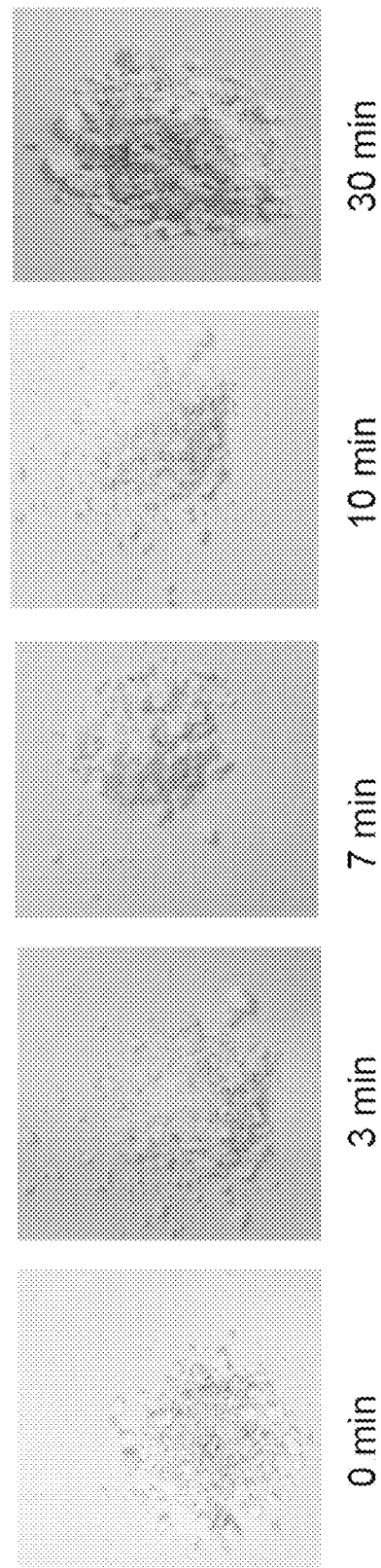
FIG. 11B shows photographs of a PEG-6000/15 mol % $Ca^{2+}$-doped $MgCO_3$ composite PCM heated at 80° C. for different lengths of time.

FIGS. 11A and B show photographs of the results of seepage tests of the PEG-6000/15 mol % $Ca^{2+}$-doped $MgCO_3$ composite carried out by maintaining the material at a temperature slightly above the melting temperature of PEG alone and observing the stability of the structure. FIG. 11A shows pure PEG and row FIG. 11B shows the PEG-6000/15 mol % $Ca^{2+}$-doped $MgCO_3$ composite, each heated at 80° C. over the indicated time periods. As shown in FIG. 11A, pure PEG completely melts into a liquid after heat treatment at 80° C. for 7 min or longer. However, the PEG-6000/15 mol % $Ca^{2+}$-doped $MgCO_3$ composite retains its solid powder form during the complete heating process, and no liquid leakage is observed from the sample. The porous 15 mol % $Ca^{2+}$-doped $MgCO_3$ structure is believed to provide mechanical strength to prevent seepage of molten PEG during phase transformation.

Figure 12A:
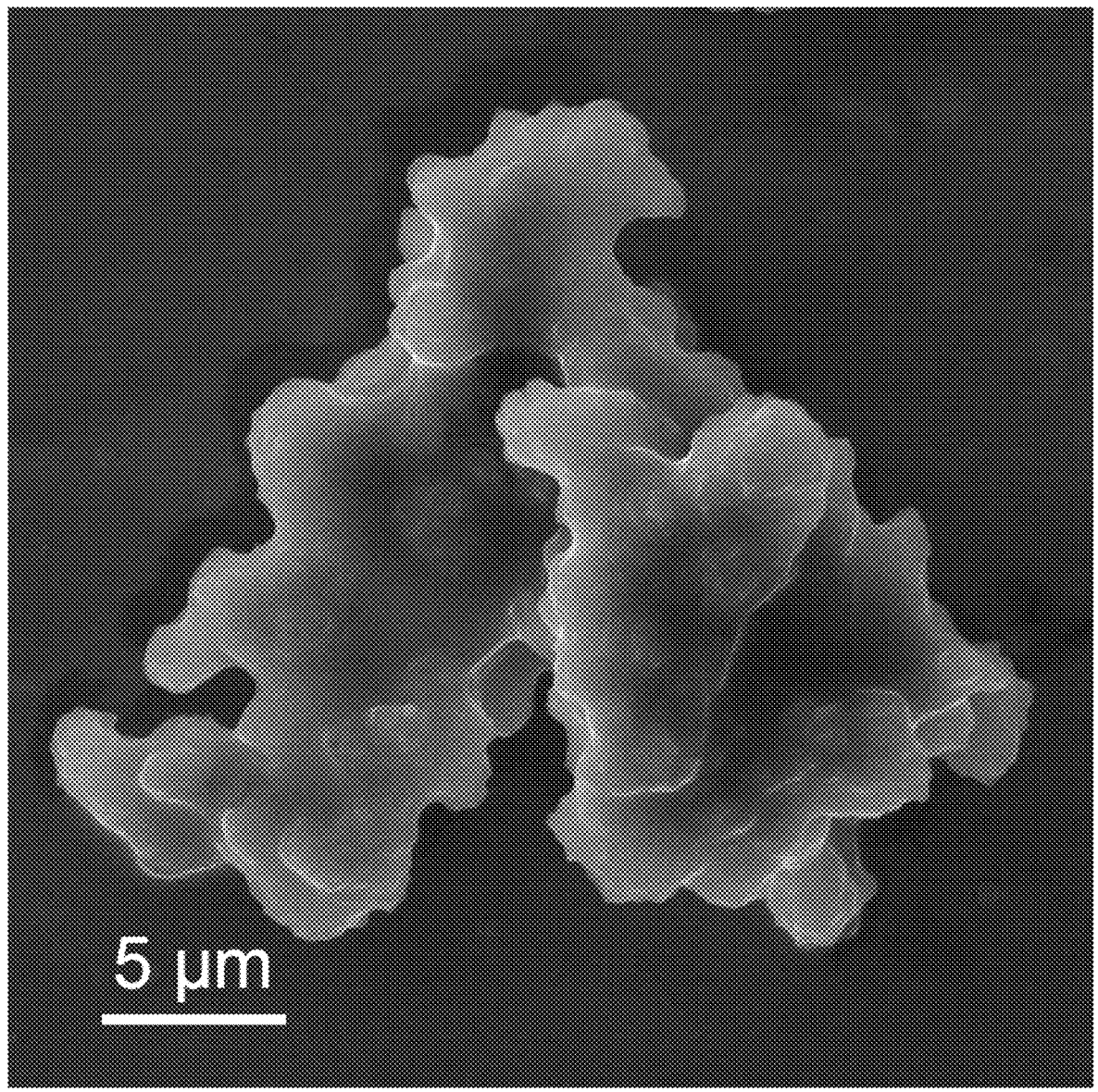
FIG. 12A shows an FE-SEM image of a PEG-6000/15 mol % $Ca^{2+}$-doped $MgCO_3$ composite PCM.
Figure 12B:
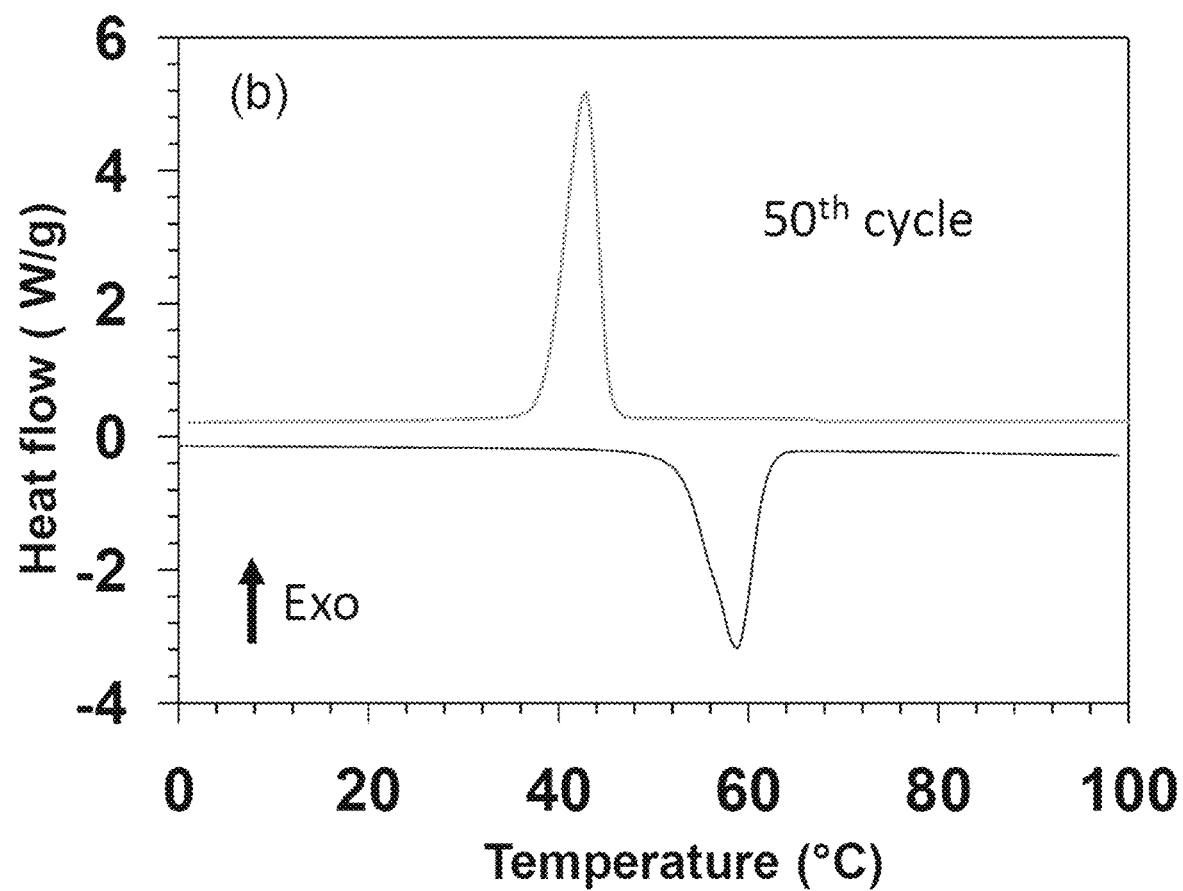
FIG. 12B shows melting-freezing DSC curves of the PEG-6000/15 mol % $Ca^{2+}$-doped $MgCO_3$ composite PCM.

FIG. 12A shows the microstructure and FIG. 12B shows the phase change properties of the PEG-6000/15 mol % $Ca^{2+}$-doped $MgCO_3$ composite PCM after the seepage test, measured using FE-SEM and DSC. FIG. 12A evidences that the microstructures of inventive composites, and their phase change properties, can remain unchanged after the seepage test. Thus, the PEG in the 15 mol % $Ca^{2+}$-doped $MgCO_3$ matrix retained its original structure and properties after undergoing thermal cycling, as seen in the DSC curves in FIG. 12B. These thermal cycling tests revealed that the PEG/CaMgCO$_3$ composites provided excellent thermal reliability over at least 50 melting/solidifying cycles. The properties of inventive composites may be maintained over at least 75, 100, 150, 200, 250, or even 500 cycles, though the cycling will be limited by the harshness of the heating conditions as well as oxidative and other degradation of the composite, particularly the organic portion. The results in FIG. 12B demonstrate that PEG/CaMgCO$_3$ has enhanced thermal reliability, with no impurity peaks being observed in the DSC curves of the sample, even after 50 cycles.

Figure 13A:
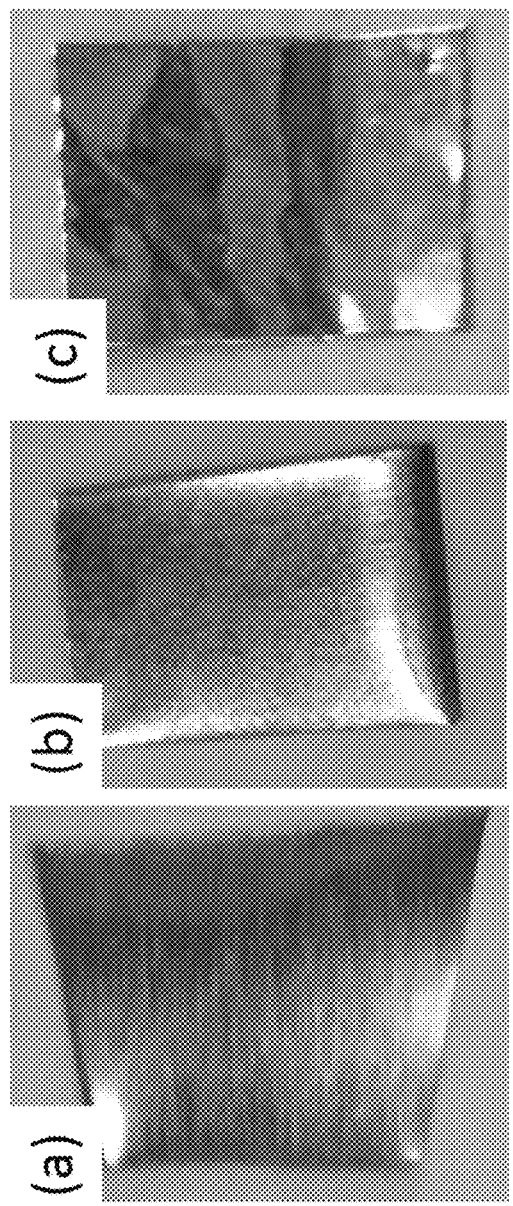
FIG. 13A shows compatibility test photographs of (a) tin, (b) aluminum, and (c) copper metal sheets embedded in PEG-6000/15 mol % $Ca^{2+}$-doped $MgCO_3$ samples.
Figure 13B:
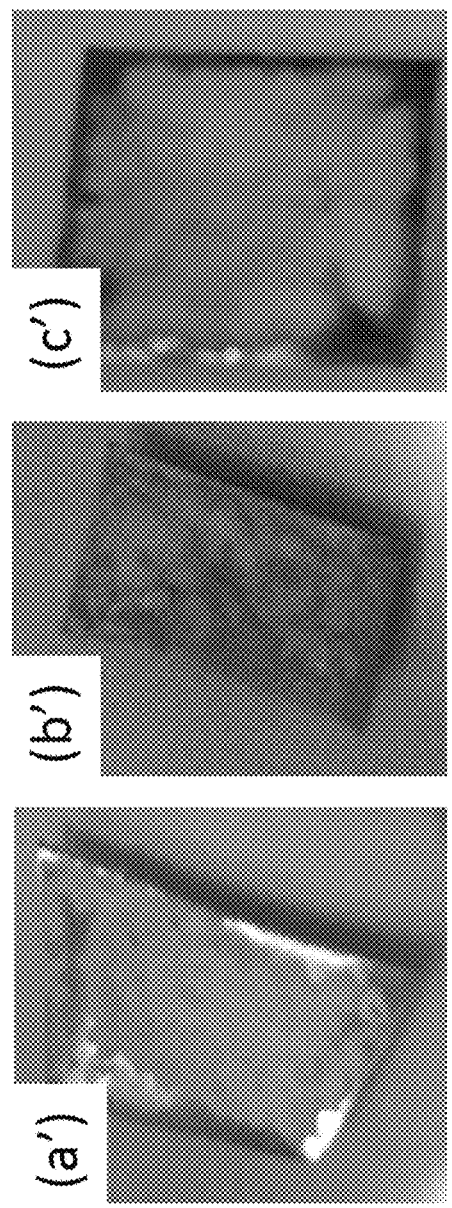
FIG. 13B respectively show compatibility test photographs of the samples from FIG. 13A (a)-(c) after two months under atmospheric conditions in Dammam, Saudi Arabia (high temperature July-August~50° C., lowest temperature ~10° C.).

FIG. 13A (a) to (c) illustrate the compatibility of the 15 mol % $Ca^{2+}$-doped $MgCO_3$ composite PCMs with the preserving materials. That is, the 15 mol % $Ca^{2+}$-doped $MgCO_3$ composite PCMs were coated onto (a) Al, (b) Sn, and (c) Cu metal sheets. The Al and Sn sheet samples in contact with the inventive PCMs displayed almost no corrosion, indicating that 15 mol % $Ca^{2+}$-doped $MgCO_3$ can have good compatibility with Al or Sn surfaces, particularly under high-intensity solar radiation and/or high humidity. On the other hand, the Cu sheet metal samples displayed corrosion in regions contacted by 15 mol % $Ca^{2+}$-doped $MgCO_3$, as seen in (C). FIG. 13B (a') to (c') show the same materials after two months (July-August) under environmental conditions in Dammam, Saudi Arabia. The initially white Cu sample, after coating with the 15 mol % $Ca^{2+}$ doped $MgCO_3$PCM, changed to a light blue color under the same thermal cycling conditions as the Al or Sn samples. This advises additional coatings and/or barriers for copper or Cu alloy storage media using the 15 mol % $Ca^{2+}$-doped $MgCO_3$ composite PCMs.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of preparing a phase change composite of polyethylene glycol (PEG) encapsulated in a porous matrix, the method comprising:
    dissolving magnesium nitrate, calcium nitrate, and ammonium carbonate in water to form a solution;
    stirring the solution at constant pH in the range of 7.5 to 9.5 for 6 to 18 hours;
    heating the solution at a temperature in the range of 150 to 250° C. for 12 to 48 hours to produce mesoporous calcium ion doped magnesium carbonate comprising 5-15 mol % calcium ions on $MgCO_3$;
    mixing the mesoporous calcium ion doped magnesium carbonate with an alcoholic solution comprising a polyethylene glycol having a number-average molecular weight of from 4,000 to 8,000 and an alcohol, and stirring for a time in the range of 2 to 8 hours; and
    evaporating the alcohol to produce the composite of the polyethylene glycol encapsulated in a mesoporous calcium ion doped magnesium carbonate.

2. The method of claim 1, wherein the mesoporous calcium ion doped magnesium carbonate comprises at least 90 wt % calcium ion doped magnesium carbonate.

3. The method of claim 1, wherein the composite has an apparent melting enthalpy in a range of from 400 to 600 J/g.

4. The method of claim 1, wherein the mesoporous calcium ion doped magnesium carbonate has a BET specific surface area in a range of from 10 to 20 m$^2$/g.

* * * * *